US012772116B2

(12) United States Patent
Akman et al.

(10) Patent No.: US 12,772,116 B2
(45) Date of Patent: Oct. 20, 2026

(54) DETECTING PRESENCE OF RADIO ACCESS NETWORK (RAN) SHARING AND DETERMINING RAN SHARING TYPE

(71) Applicant: Juniper Networks, Inc., Sunnyvale, CA (US)

(72) Inventors: Arda Akman, San Ramon, CA (US); Jeremy Alan Tidemann, Savoy, IL (US); Constantine Dimitrios Polychronopoulos, Saratoga, CA (US); Burcu Sahin, San Jose, CA (US); Marc-Andre Bordeleau, Shawinigan (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 219 days.

(21) Appl. No.: 18/829,146

(22) Filed: Sep. 9, 2024

(65) Prior Publication Data

US 2025/0097778 A1 Mar. 20, 2025

Related U.S. Application Data

(60) Provisional application No. 63/582,764, filed on Sep. 14, 2023.

(51) Int. Cl.
*H04W 28/24* (2009.01)
*H04W 16/14* (2009.01)
*H04W 84/04* (2009.01)

(52) U.S. Cl.
CPC ........... *H04W 28/24* (2013.01); *H04W 16/14* (2013.01); *H04W 84/042* (2013.01)

(58) Field of Classification Search
CPC ... H04W 28/24; H04W 16/14; H04W 84/042; H04W 24/02; H04W 28/02;

(Continued)

(56) References Cited

U.S. PATENT DOCUMENTS

2019/0021124 A1 1/2019 Alonso et al.
2021/0266870 A1* 8/2021 Bhandari .............. H04W 72/04

(Continued)

OTHER PUBLICATIONS

Wen-Ping Lai, Wen-Ru Chen, Ming-Jay, Hong-Lun Lai, Chia-Ying Lin and Po-Chen Tseng Software Defined Radio Access Network Sharing by Multi-Operator Core Networks APSIPA ASC 2022 (Year: 2022).*

(Continued)

*Primary Examiner* — Fred A Casca
(74) *Attorney, Agent, or Firm* — Shumaker & Sieffert P.A.

(57) ABSTRACT

Techniques are described for determine a type of Radio Access Network (RAN) sharing employed within a network. In one example, a computing system receives a message for implementing a network slice of a RAN comprising a profile including a first Public Land Mobile Network (PLMN) identifier for the RAN and a first operating bands value. Based on determining that another RAN slice subnet is provisioned within the RAN with a second PLMN identifier and the first operating bands value, the computing system determines a RAN sharing type is Multi-Operator Core Network (MOCN). Based on determining that no RAN slice subnet is provisioned within the RAN with the second PLMN identifier and the first operating bands value, the computing system determines the RAN sharing type is Multi-Operator RAN (MORAN). The computing system forwards network traffic for subscriber devices in accordance with the determined RAN sharing type.

20 Claims, 14 Drawing Sheets

(58) Field of Classification Search
CPC .......... H04W 72/0453; H04W 72/0457; H04L 41/0806; H04L 41/0895; H04L 41/0266; H04L 41/04; H04L 67/30
See application file for complete search history.

(56) References Cited

U.S. PATENT DOCUMENTS

| | | | |
|---|---|---|---|
| 2023/0189006 | A1 | 6/2023 | Chou et al. |
| 2024/0220389 | A1 | 7/2024 | Wu et al. |

OTHER PUBLICATIONS

Response to Extended Search Report dated Feb. 3, 2025, from counterpart European Application No. 24200214.5 filed Sep. 11, 2025, 11 pp.
Extended Search Report from counterpart European Application No. 24200214.5 dated Feb. 3, 2025, 6 pp.
Pinheiro et al., “5GECO: A Cross-domain Intelligent Neutral Host Architecture for 5G and Beyond”, IEEE Infocom 2023-IEEE Conference on Computer Communications Workshops (INFOCOM WKSHPS), IEEE, May 20, 2023, 6 pp.
“Infrastructure Sharing: An Overview,” https://www.gsma.com/solutions-and-impact/technologies/networks/gsma_resources/infrastructure-sharing-an-overview/, Jun. 18, 2019, 11 pp.
“Technical Specification Group Services and System Aspects; System architecture for the 5G System (5GS),” 3GPP TS 23.501 V17.0.0, Mar. 2021, 489 pp.
“Technical Specification Group Services and System Aspects; System architecture for the 5G System (5GS),” 3GPP TS 23.501 V18.2.2, Jul. 2023, 694 pp.
“5G, Management and Orchestration; 5G Network Resource Model (NRM)”, stage 2 and stage 3, 3GPP TS 28.541, version 17.6.0, release 17, May 2022, 521 pp.
O-RAN Alliance, “O-RAN Architecture Description 7.0”, https://orandownloadsweb.azurewebsites.net/specifications, Oct. 21, 2022, 38 pp.

* cited by examiner

DETECTING PRESENCE OF RADIO ACCESS NETWORK (RAN) SHARING AND DETERMINING RAN SHARING TYPE

This application claims the benefit of U.S. Provisional Application No. 63/582,764, filed Sep. 14, 2023, the entire content of which is incorporated herein by reference.

TECHNICAL FIELD

The disclosure relates to computer networking and, more specifically, to radio access networks.

BACKGROUND

Computer networks have become ubiquitous, and the number of network applications, network-connected devices, and types of network-connected devices are rapidly expanding. Such devices now include computers, smartphones, Internet-of-Things (IoT) devices, vehicles, medical devices factory equipment, etc. 5G mobile network architectures enhanced the ability to provide communication services using cloud-based network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc. A network slice is a logical network (e.g., part of a RAN) that provides specific network capabilities and network characteristics, supporting various service properties for network slice customers. The management and orchestration of network slices is performed by network operators in support of their communication services.

The infrastructure for a RAN may be shared by different network operators. Several different schemes may be used to share various infrastructures for a RAN; such infrastructure may include one or more of a core network, a radio controller, a backhaul network, a base station, a site, or spectrum bandwidth and can be shared amongst multiple network operators. For example, in Multi-Operator Radio Access Network (MORAN), infrastructure for the RAN is shared, but different network operators are allocated different, non-overlapping spectrum bandwidth for exchanging network traffic. As another example, in Multi-Operator Core Network (MOCN), the entire infrastructure for the RAN is shared, including spectrum bandwidth, such that different network operators may be allocated the same or overlapping spectrum bandwidth for exchanging network traffic. In addition, different operators may use various, complex combinations of MORAN, MOCN, and other RAN-sharing schemes within a single mobile network infrastructure.

SUMMARY

In general, the disclosure describes techniques for automatically detecting the presence of Radio Access Network (RAN) sharing within a network and determining a type of the RAN sharing employed within the network. In one example, a computing system receives a message for implementing a network slice of a RAN. The message comprises a profile including a first Public Land Mobile Network (PLMN) identifier and a first operating bands value. The computing system may analyze one or more fields in one or more data structures of the message to infer that a RAN is being shared and/or the RAN sharing type. For example, the computing system determines that another RAN slice subnet is provisioned within the RAN with a second PLMN identifier. Based on the presence of the first PLMN identifier and second PLMN identifier within a common RAN, the computing system determines that RAN sharing is employed within the network.

In a first scenario, the computing system may determine that the other RAN slice subnet provisioned within the RAN with the second PLMN identifier is provisioned with the same first operating bands value. Because the first PLMN identifier and the second PLMN identifier are configured to use the same first operating bands, the computing system determines that the RAN sharing type is MOCN.

In a second scenario, the computing system may determine that no other RAN slice subnet, having a different PLMN identifier than the first PLMN identifier, is provisioned within the RAN with the same first operating bands value. Therefore, because RAN slice subnets are provisioned with different PLMN identifiers but such RAN slice subnets do not share the same first operating bands, the computing system determines the RAN sharing type is MORAN.

The computing system may configure one or more network devices to forward network traffic for one or more subscriber devices in accordance with the determined RAN sharing type. For example, the computing system may configure and/or provision a RAN slice subnet or core network slice subnet in accordance with the profile specified by the message and the determined RAN sharing type.

The techniques may provide one or more technical advantages that realize at least one practical application. For example, the techniques of the disclosure may enable a computing system to determine a type of RAN sharing employed for a mobile network and use the determined RAN sharing type to manage a network slice in the RAN. Furthermore, the techniques of the disclosure may enable a computing system to determine the type of RAN sharing employed prior to, during, or after provisioning a network slice or network slice subnet in the mobile network. Moreover, the techniques of the disclosure may enable a computing system to determine changes in the type of RAN sharing employed in the mobile network, or to determine arbitrarily complex RAN sharing configurations, such as when two parties employ a first type of RAN sharing, and thereafter one of the parties employs a second type of RAN sharing with a third party. Such a computing system as described herein may be able to differentiate between different types of RAN sharing, apply different network slice and network service profiles dependent on the type of RAN sharing employed, and apply different Service Level Agreement (SLA) policies or network policies to network traffic dependent on the type of RAN sharing employed. Accordingly, the techniques in this disclosure may provide a capability to change one or more operational characteristics of a RAN depending on the RAN sharing type, where the RAN is being shared, to better support the provisioning, operation, management, and administration of network slices.

In one example, this disclosure describes a computing system comprising: processing circuitry in communication with storage media, the processing circuitry configured to: receive a message for implementing a network slice of a Radio Access Network (RAN), the message comprising a profile that includes a first Public Land Mobile Network (PLMN) identifier for the RAN and a first operating bands value; based at least in part on determining that at least one RAN slice subnet is provisioned within the RAN with a second PLMN identifier and the first operating bands value, determining a RAN sharing type is Multi-Operator Core Network (MOCN); and based at least in part on determining that no RAN slice subnet is provisioned within the RAN with the second PLMN identifier and the first operating bands value, determining the RAN sharing type is Multi-Operator RAN (MORAN).

In another example, this disclosure describes a method comprising: receiving, by a computing system, a message for implementing a network slice of a Radio Access Network (RAN), the message comprising a profile that includes a first Public Land Mobile Network (PLMN) identifier for the RAN and a first operating bands value; based at least in part on determining that at least one RAN slice subnet is provisioned within the RAN with a second PLMN identifier and the first operating bands value, determining, by the computing system, a RAN sharing type is Multi-Operator Core Network (MOCN); and based at least in part on determining that no RAN slice subnet is provisioned within the RAN with the second PLMN identifier and the first operating bands value, determining, by the computing system, the RAN sharing type is Multi-Operator RAN (MORAN).

In another example, this disclosure describes non-transitory, computer-readable media comprising instructions that, when executed, are configured to cause processing circuitry to: receive a message for implementing a network slice of a Radio Access Network (RAN), the message comprising a profile that includes a first Public Land Mobile Network (PLMN) identifier for the RAN and a first operating bands value; based at least in part on determining that at least one RAN slice subnet is provisioned within the RAN with a second PLMN identifier and the first operating bands value, determining a RAN sharing type is Multi-Operator Core Network (MOCN); and based at least in part on determining that no RAN slice subnet is provisioned within the RAN with the second PLMN identifier and the first operating bands value, determining the RAN sharing type is Multi-Operator RAN (MORAN).

The details of one or more examples are set forth in the accompanying drawings and the description below. Other features, objects, and advantages will be apparent from the description and drawings, and from the claims.

DETAILED DESCRIPTION

Figure 1A:
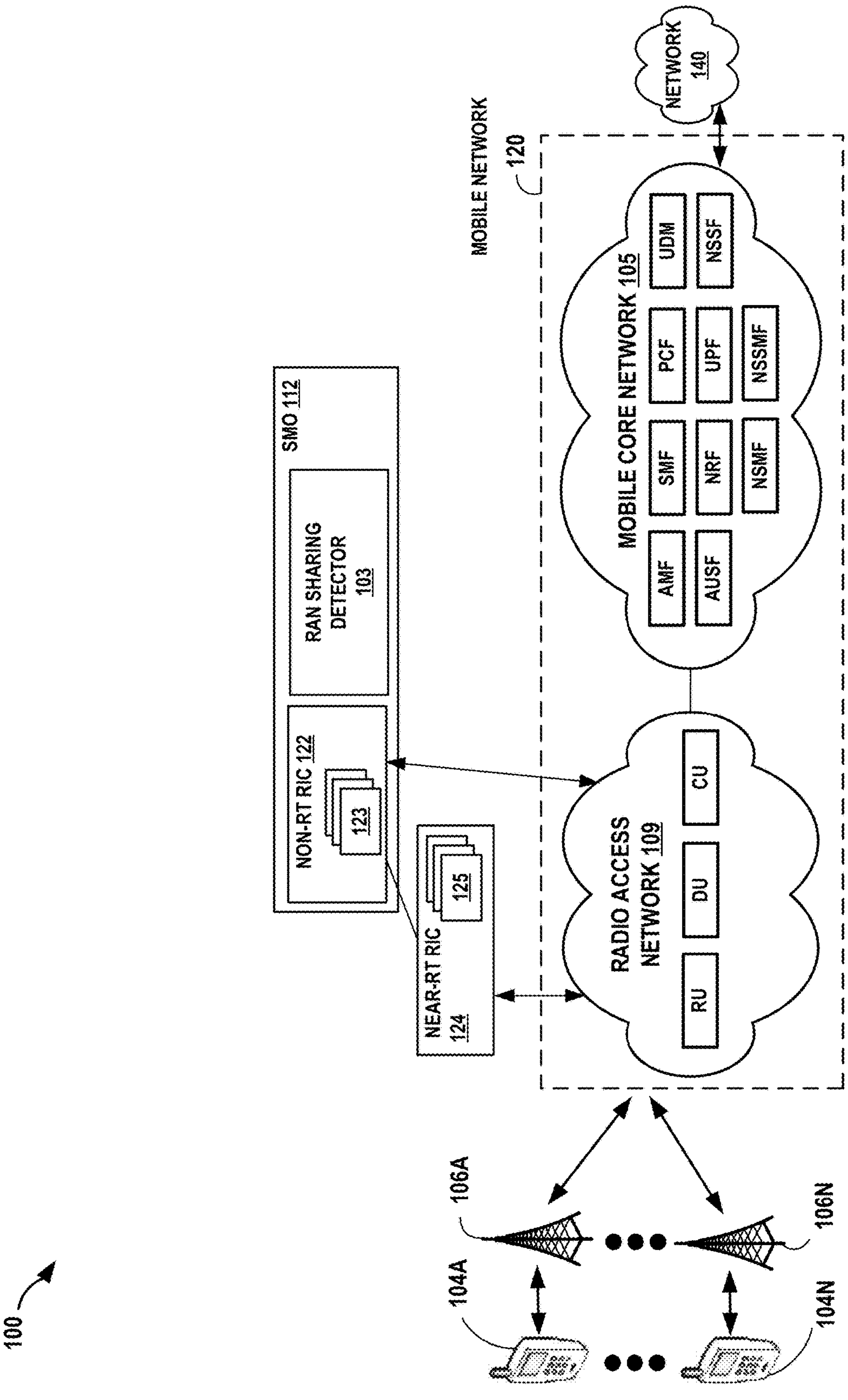
FIG. 1A is a block diagram illustrating an example network system configured to detect the presence of mobile network sharing, in accordance with one or more techniques of the disclosure.

While there are standards-based definitions for network slice management and for RAN sharing, handling the intersection of these two computer networking capabilities is problematic. There are no existing defined interfaces, scenarios, procedures, and/or solutions on how to handle the combination of RAN sharing and RAN slice management. For example, a network may employ basic RAN sharing scenarios, such as MORAN, where a RAN is shared and dedicated spectrum is used by each operator, and MOCN, where a RAN and spectrum are shared by operators). In addition, may complex use cases exist. For example, Operator A and Operator B may start a MORAN-based RAN sharing agreement on Operator A's infrastructure, with Operator B later entering into a MOCN RAN Sharing agreement with Operator C, on top of Operator A's infrastructure. Existing RAN slice management is not structured to be aware of and automatically discover a RAN sharing type because there is no explicit information defined in various third generation partnership project (3GPP) specifications to indicate RAN sharing while creating the network slice. In various scenarios, RAN sharing may already be in place before slicing is introduced, RAN sharing may be added after slicing is introduced and one or more slices are provisioned, and a RAN sharing type could be MORAN or MOCN (or CN sharing, which does not change RAN behavior).

The techniques of the present disclosure provide an approach to automatically detect such RAN sharing scenarios and determine a RAN sharing type without any additional manual intervention/input from an operator, thereby allowing for automatic changing of operational characteristics of the RAN to better support sharing arrangements and/or network slices. A computing system as described herein may thereafter manage network slices in the RAN based on the determined RAN sharing type. For example, computing system may configure one or more network devices to forward network traffic for one or more subscriber devices in accordance with the determined RAN sharing type. In addition, the computing system may configure and/or provision a RAN slice subnet or core network slice subnet in accordance with the profile specified by the message and the determined RAN sharing type.

As used herein, a Host Operator is the Operator that owns the infrastructure, manages the network, and leases a (portion) of it to one or more Operators. A Tenant Operator is the Operator that uses/leases another Operator's infrastructure to provide services. Core Network (CN) sharing refers to servers and core network functionalities being shared.

The techniques of this disclosure provide support for tenant Operator network slice management function(s) (NSMF(s)) to drive the hosting (e.g., infrastructure leasing) of an Operator's RAN network slice subnet management function (NSSMF) for RAN slices and MORAN and MOCN RAN sharing scenarios. The techniques of this disclosure provide support for multi-tenant MORAN and MOCN RAN sharing scenarios where the leasing Operator further leases the "leased" resource to a third Operator. The techniques of this disclosure provide support for (MORAN and MOCN) RAN sharing SLAs within a RAN NSSMF. The techniques of this disclosure also provide support for per Operator/public land mobile network (PLMN) slice subnet SLAs within a multi-tenant SLA-based RAN sharing scenarios. These techniques may also be applied to NSMF.

A network service, such as a network slice, may be formed from various elements and sub-elements, such as clouds, cloud providers, data centers, resource groups, resources, clusters, manager nodes, and worker nodes. In some examples, a user, such as a network operator, may desire to deploy thousands or tens of thousands of clouds and/or resources in an inventory to support the network service.

A network service provider can provide a portal to a network provisioning system where the portal presents visual cues via a user interface that provides visualizations of the service provisioning process and receives user input that, in some cases, can be selected from the visualizations. In some aspects, the user can be a tenant (e.g., a customer) of a 5G mobile network operator. As an example, the tenant may be an enterprise customer of the mobile network operator. In some aspects, the user can be an administrator of a 5G network service provider.

Provisioning a service in a 5G network domain can involve multiple services and multiple service providers. For example, provisioning an end-to-end 5G network slice may involve provisioning network functions to support the network slice in multiple geographically distributed data centers ("multi-cloud") and may further involve services provided and implemented in multiple network domains ("multi-domain") such as RAN, transport networks, core network services, and via core interfaces (e.g., the service gateway interface (SGi)). The different services and network domains may have different capabilities, functions, and service levels. A tenant may want to provision a complete communication service, and in some cases related network slices, to a network infrastructure owned or leased by the tenant.

A tenant (or network service provider for a provider-owned slice, or another party) may initiate, on-demand, provisioning of a communication service, such as a network slice, with a pre-defined service level agreement (SLA) and network slice templates (NSTs), and the tenant can specify different attributes of the service, e.g., tracking areas, compute clouds/data centers, allowed subscribers, network slice selection policies, etc. A network provisioning system may facilitate a service order creation process that can be used by an end-user to request on-demand provisioning of an end-to-end network that can be created for specific SLA, use cases, and user requirements. In some aspects, the end-user can be a tenant of a mobile network operator that can provision communication services on an on-demand basis.

A network service provider such as a mobile network operator can utilize the techniques described herein to provide networking as a service (NaaS) to their customers, as well as to facilitate management and administration of networking services. For example, the techniques can facilitate end-user and on-demand provisioning of private mobile networks. Examples of such private mobile networks include dedicated networks for connected vehicles, Internet-of-Things (IoT) networks, networks for industries etc. In some aspects, the network service provider may create, on demand, a network slice having QoS and other parameters based on a service order generated by a tenant or other end-user.

The techniques disclosed herein include a provisioning portal that provides a user interface facilitating creation of service orders by tenants and other clients of a network operator. The user interface can lead a user through a series of operations of a workflow that can result in the creation of a service order that can instruct a provisioning system to configure and deploy a network service for the user. As a practical application of the techniques described in this disclosure, a provisioning portal can be used by an end-user tenant of a network operator to provision communication services of the network operator for use by the tenant. The provisioning portal can facilitate an end-user ordering a network service and have the network service provisioned on-demand without involving mobile network operator personnel. As a result, a tenant may be able to receive the benefits of the communication server sooner when compared with existing systems. Further, there may be less overhead for a mobile network operator.

FIG. 1A is a block diagram illustrating an example network system configured to detect the presence of mobile network sharing, in accordance with one or more techniques of the disclosure. In the example illustrated in FIG. 1A, network system 100 includes Service Management and Orchestration (SMO) system 112, non-RT RIC 122, near-RT RIC 124, and mobile network 120. Mobile network 120 includes one or more radio access networks (RANs), e.g., RAN 109, and mobile core network (or simply "core") 105 that provides user equipment 104A-104N (collectively, "UEs 104") with access to one or more applications or services provided by data network 140. In some examples, mobile network 120 comprises a 5G or xG mobile network.

UEs 104 may represent smartphones, desktop computers, laptop computers, tablets, smart watches, and/or "Internet-of-Things" (IoT) devices, such as cameras, sensors, televisions, appliances, or the like. As shown in FIG. 1A, mobile network 120 includes RAN 109 that provides network access, data transport, and other services to UEs 104. In some examples, RAN 109 may be an Open Radio Access Network (O-RAN), a 5G mobile network RAN, a 4G LTE mobile network RAN, another type of RAN, a 3GPP mobile network RAN, or a combination of the above. For example, in a 5G-radio access network, RAN 109 comprises a plurality of cell sites (or simply "cells") that each include radio equipment, such as respective base stations 106A-106N (collectively, "base stations 106"), also known as gNodeBs, to exchange packetized data within a data network to ultimately access one or more applications or services provided by data network 140. Each of base stations 106 is divided into three functional components: radio unit (RU), distributed unit (DU), and central unit (CU), which can be deployed in various configurations. RU manages the radio frequency layer and has antenna arrays of various sizes and shapes. DU performs lower layer protocol processing. CU performs the upper layer protocol processing. Depending on operator and service requirements, base stations 106 can be deployed monolithically, e.g., RU, DU, and CU reside within a cell site, or these functionalities can be distributed across cell sites while the CU resides in an edge cloud site controlling a plurality of distributed DUs. O-RAN is, for example, an approach to networking in which disaggregated functions can be used to deploy mobile fronthaul and midhaul networks. The disaggregated functions can be cloud-based functions.

RAN 109 of mobile network 120 connects to core 105 to exchange packets with data network 140. Core 105 may be a 5G core network, and data network 140 may represent, for example, one or more service provider networks and services, the Internet, third party services, one or more IP-VPNs, an IP-multimedia subsystem, a combination thereof, or other network or combination of networks. In some examples, resources associated with the service provided by a mobile network operator to the tenant may be provided by, or managed by, functions of core 105 and/or components of RAN 109. In some examples, core 105 implements various discrete control plane and user plane functions for network system 100. Examples of 5G control plane functions that may be provided by core 105 include Access Mobility Management Function (AMF) that provides access mobility management services, Session Management Function (SMF) that provides session management services, Policy Control Function (PCF) that provides policy control services, User Data Management (UDM) that provides management of network user data, Network Repository Function (NRF) that provides a repository that can be used to register and discover services in a network operator's network, Authentication Server Function (AUSF) that provides authentication services, Network Slice Selection Function (NSSF), NSMF that may be used to select an instance of an available network slice for use by any of UE devices 104, and Network Slice Subnet Management Function (NSSMF) that provides coordination, management, and orchestration of network slice subnet instances (NSSI). Core 105 may also include User Plane Functions (UPF) that provides packet routing, forwarding and other network data processing functions (e.g., Quality of Service, packet inspection, traffic optimization etc.).

Further details on services and functions provided by the 5G core, can be found in 3rd Generation Partnership Project 2021, *Technical Specification Group Services and System Aspects; System architecture for the 5G System (5GS); Stage 2 (Release* 17), TS 23.501 V17.0.0 (2021-03), which is superseded by 2021, *Technical Specification Group Services and System Aspects; System architecture for the 5G System (5GS); Stage 2 (Release* 18), TS 23.501 V18.2.2 (2023-07), the entire contents of each of which are hereby incorporated by reference. Further details on services and functions provided by RAN 109 can be found in "*5G, Management and Orchestration; 5G Network Resource Model (NRM)*", *stage 2 and stage 3, 3GPP TS 28.541, version 17.6.0, release* 17 (2022-05), the entire contents of which are hereby incorporated by reference. Further details on the O-RAN architecture can be found in O-RAN Alliance, "O-RAN Architecture Description," version 7.00, October 2022, the entire contents of which is hereby incorporated by reference.

A network system, such as network system 100, may include a Service Management and Orchestration (SMO) system offering various framework functions along with a non-RT RIC, configured in accordance with Open Radio Access Network (O-RAN) standards ("O-RAN architecture"), to manage and/or monitor aspects of a RAN and/or 5G core. The O-RAN architecture may include a non-RT RIC and a near-RT that each executes different functions and services for RAN functions. A non-RT RIC is an orchestration and automation function configured to provide radio resource management, higher layer procedure optimization, policy optimization, and provide guidance, parameters, policies and artificial intelligence (AI) and machine learning (ML) models to support the operation of near-RT RIC functions in the RAN. The non-RT RIC may onboard one or more applications (e.g., rApps) that provide non-real time (e.g., greater than one second) control of RAN elements and their resources, and the near-RT RIC may onboard one or more applications (e.g., xApps) that provide near-real time control of RAN elements and their resources.

The O-RAN architecture includes several interfaces, such as A1, O1, and O2 interfaces, that are each used to provide the functions and services by which the SMO and RIC can configure or direct other components of the RAN. For example, the functions and services of a non-RT RIC may include policy management services and/or enrichment information services for a near-RT RIC that are provided over an A1 interface (collectively referred to herein as "A1 services" because they provided over the A1 interface); Operations, Administration, and Management (OAM) services, such as performance management services and configuration management services, for O-RAN management elements that are provided over an O1 interface (referred to herein as "O1 services" because they are provided over the O1 interface); infrastructure management services and deployment management services for resources of an O-RAN cloud that are provided over an O2 interface (referred to herein as "O2 services" because they are provided over the O2 interface), and/or other services, such as service management and exposure (SME) services (e.g., registration of a service, update of a service registration), data management and exposure (DME) services, and/or AI/ML services.

As depicted in the example of FIG. 1A, aspects of RAN 109 and/or core 105 may be managed and/or monitored by SMO 112, non-RT RIC 122, and near-RT RIC 124. In some examples, SMO 112, non-RT RIC 122, and near-RT RIC 124 may be operated by the mobile network operator providing 5G services to a tenant. SMO 112 can orchestrate and control management and automation aspects of RAN 109 (e.g., network slicing, management, and orchestration of O-Cloud, etc.). Further, SMO 112 may control aspects of non-RT RIC 122 and near-RT RIC 124. Non-RT RIC 122 can provide non-real-time (e.g., greater than one second) control and optimization of RAN elements and resources such as RUs, DUs, and CUs, workflow management, and policy-based control of applications and features of near-RT RIC 124. Near-RT RIC 124 can provide near-real-time (e.g., milliseconds) control and optimization of RAN elements and resources via fine-grained data collection and actions via E2 interface 165. As further described in FIG. 1B, non-RT RIC 122 and near-RT RIC 124 may deploy as a highly scalable, microservices based containerized architecture. In some examples, near-RT RIC 124 may be located within an edge or regional cloud.

Non-RT RIC 122 may onboard one or more applications, e.g., applications 123 (e.g., rApps of FIG. 1B) that manage non-real time events within non-RT RIC 122, such as applications that do not require response times of less than one second. Applications 123 may leverage the functionality exposed via the non-RT RIC framework of non-RT RIC 122. Applications 123 may be used to control and manage RAN elements and resources, such as near-RT RIC 124, RAN nodes, and/or resources in the O-RAN cloud. Applications 123 may also utilize network data, performance metrics, and subscriber data to provide recommendations for network optimization and operational guidance (e.g., policies) to one or more applications of near-RT RIC 124. Although illustrated as within non-RT RIC 122, any one or more of applications 123 may be executed by a third party, separate from non-RT RIC 122.

As described further below, non-RT RIC 122 may provide services using A1, O1, and O2 interfaces. An A1 interface connects the non-RT RIC 122 and near-RT RIC 124. Non-RT RIC 122 may perform services via the A1 interface, such as policy management services (e.g., creation and update of a policy), ML model management services, and/or enrichment information services. Services performed via the A1 interface are referred to herein as "A1 services." An O1 interface may include an interface that connects SMO 112 with O-RAN managed elements, such as near-RT RIC 124 and/or RAN nodes (e.g., O-RAN centralized unit (O-CU), O-RAN distributed unit (O-DU)). Non-RT RIC 122 may perform services via the O1 interface, such as configuration management services and performance management services of O-RAN managed elements (e.g., operation and maintenance (OAM) services), fault supervision, file management, heartbeat, trace, physical network function (PNF) discovery, software management, etc.). Services performed via the O1 interface are referred to herein as "O1 services." An O2 interface may include an interface that connects SMO 112 to resources of the ORAN O-Cloud. The O-Cloud may comprise of one or more physical infrastructure nodes that host O-RAN functions (e.g., virtual network functions), the supporting software components, and the appropriate management and orchestration functions. Non-RT RIC 122 may perform services via the O2 interface, such as services that provide infrastructure management and/or network function deployment of the resources in the O-Cloud (e.g., discovery and administration of O-Cloud resources; Scale-In, Scale-Out of cloud/deployments; Fault, Configuration, Accounting, Performance, and Security (FCAPS) of cloud/deployments, software management of cloud platform/deployments; create/delete deployment and associated allocated O-Cloud resources). Services performed via the O2 interface are referred to herein as "O2 services." Non-RT RIC 122 may also perform other functions and services, such as service management and exposure (SME) services (e.g., registration of a service, update of a service registration), data management and exposure (DME) services, AI/ML services, or the like.

The techniques of this disclosure, as implemented in RAN sharing detector 103 of SMO 112, provide for automatic detection of RAN sharing and determination of a RAN sharing type during slice management operations. Conventional specifications for RAN sharing do not cover automatic detection, and may require manual input or intervention by an operator to configure RAN sharing or determining the presence of such RAN sharing.

In accordance with the techniques of the disclosure, RAN sharing detector 103 of SMO 112 may automatically detect the presence of RAN sharing within mobile network 120 and determine a type of the RAN sharing employed within mobile network 120.

For example, RAN sharing detector 103 receives a message for implementing a network slice of RAN 109. In some examples, RAN sharing detector 103 receives the message from an NSMF of mobile core network 105 for RAN 109. The message comprises a profile including a first PLMN identifier and a first operating bands value. In some examples, the profile comprises a slice profile ("SliceProfile") data structure that includes a PLMN identifier ("plmn-info" ID) and an operating bands ("nrOperatingBands") value. RAN sharing detector 103 analyzes current values of various fields of data structures of the 5G NRM to automatically detect the presence of RAN sharing and RAN sharing type.

For example, RAN sharing detector 103 analyzes one or more fields in one or more data structures of the message to infer that RAN 109 is being shared. For example, RAN sharing detector 103 determines that another RAN slice subnet is provisioned within RAN 109 with a second PLMN identifier. Based on the presence of the first PLMN identifier and second PLMN identifier within common RAN 109, RAN sharing detector 103 determines that RAN sharing is employed within mobile network 120. This is because the presence of RAN subnets provisioned with two different PLMN identifiers within RAN 109 indicates that two network operators, corresponding to the two PLMN identifiers, are both using resources of RAN 109.

Therefore, in an example wherein SMO 112 has not provisioned any network slices associated with a different PLMN identifier within RAN 109, the receipt of the message associated with the first PLMN identifier indicates that only a single mobile network operator (e.g., associated with the first PLMN identifier) is using resources of RAN 109, and therefore RAN 109 is not shared.

As another example wherein SMO 112 has provisioned a network slice associated with a second PLMN identifier within RAN 109, the receipt of the message associated with the first PLMN identifier indicates that at least a first mobile network operator and a second mobile network operator (e.g., associated with the first PLMN identifier and the second PLMN identifier, respectively) are using resources of RAN 109, and therefore RAN 109 is shared.

Additionally, where RAN 109 is being shared, RAN sharing detector 103 analyzes one or more fields in one or more data structures of the message determine a RAN sharing type. In a first scenario, RAN sharing detector 103 determines that a second RAN slice subnet provisioned within RAN 109 with the second PLMN identifier has been provisioned with the same first operating bands value as specified in the profile of the message. Because the first PLMN identifier and the second PLMN identifier are configured to use the same first operating bands, RAN sharing detector 103 determines that the RAN sharing type is MOCN. This is because the presence of two different PLMN identifiers indicating use of the same operating bands indicates that two network operators, corresponding to the two PLMN identifiers, are sharing the same operating bands within RAN 109, thereby indicating that MOCN is employed by RAN 109.

In a second scenario, RAN sharing detector 103 determines that there exists no other RAN slice subnet, having a different PLMN identifier than the first PLMN identifier, that has been provisioned with the same first operating bands value within RAN 109. Therefore, because RAN slice subnets are provisioned with different PLMN identifiers (RAN 109 is shared), but such RAN slice subnets do not share the operating bands, RAN sharing detector 103 determines the RAN sharing type is MORAN. This is because the presence of two different PLMN identifiers within RAN 109 indicates that two network operators, corresponding to the two PLMN identifiers, are sharing RAN 109, but because each of the network operators have non-overlapping operating bands, there is no sharing of operating bands, thereby indicating that MORAN is employed by RAN 109.

RAN sharing detector 103 may thereafter manage network slices in the RAN based on the determined RAN sharing type. For example, RAN sharing detector 103 may configure one or more network devices, such as RUs, DUs, and CUs of RAN 109, to forward network traffic for one or more subscriber devices 104 in accordance with the determined RAN sharing type. For example, the profile may comprise a network slice profile specifying one or more network slices for provisioning within RAN 109. As another example, the profile may comprise a service profile specifying one or more network services for provisioning within the network slice of RAN 109.

RAN sharing detector 103 selects configuration profiles or templates for provisioning a network slice or a network slice subnet based at least in part on the determined RAN sharing type and the profile. In addition, RAN sharing detector 103 may apply one or more network policies or SLA policies for provisioning the network slice or network slice subnet based at least in part on the determined RAN sharing type. Furthermore, RAN sharing detector 103 may allocate resources to the network slice or network slice subnet based at least in part on the determined RAN sharing type.

As an example, the profile may comprise a RAN slice subnet profile that specifies the first operating bands value. RAN sharing detector 103 may select, configure, and/or provision a RAN slice subnet within RAN 109 in accordance with the profile specified by the message and the determined RAN sharing type. RAN sharing detector 103 may select, based on the determined RAN sharing type, a template for deploying a RAN slice subnet within RAN 109, one or more network services to be deployed within the RAN slice subnet within RAN 109, and configuration parameters with which the one or more network services are to be configured. Furthermore, RAN sharing detector 103 configures the resources allocated to the RAN slice subnet to forward traffic via first operating bands corresponding to the first operating bands value.

As another example, the profile may comprise a core slice subnet profile that specifies the first operating bands value. RAN sharing detector 103 may select, configure, and/or provision a core network slice subnet within core network 105 in accordance with the profile specified by the message and the determined RAN sharing type. RAN sharing detector 103 may select, based on the determined RAN sharing type, a template for deploying a core slice subnet within core 105, one or more network services to be deployed within the core slice subnet within core 105, and configuration parameters with which the one or more network services are to be configured. Furthermore, RAN sharing detector 103 configures the resources allocated to the core slice subnet to forward traffic via first operating bands corresponding to the first operating bands value.

In a first example, RAN sharing detector 103 configures one or more network devices, such as RUs, DUs, and CUs of RAN 109, to forward network traffic for one or more subscriber devices 104 in accordance with a determined RAN sharing type of MORAN. In this example, RAN sharing detector 103 configures RUs, DUs, and CUs of RAN 109 to forward network traffic for one or more first subscriber devices 104 that are associated with the first PLMN identifier. In particular, RAN sharing detector 103 configures RUs, DUs, and CUs of RAN 109 to forward network traffic for the one or more first subscriber devices via first operating bands corresponding to the first operating bands value specified by the profile of the received message. In addition, RAN sharing detector 103 configures RUs, DUs, and CUs of RAN 109 to forward network traffic for one or more second subscriber devices associated with a second PLMN identifier via second operating bands different from the first operating bands. In this example, the network traffic for the one or more first subscriber devices and the network traffic for the one or more second subscriber devices share a same base station and a same site.

In a second example, RAN sharing detector 103 configures one or more network devices, such as RUs, DUs, and CUs of RAN 109, to forward network traffic for one or more subscriber devices 104 in accordance with a determined RAN sharing type of MOCN. In this example, RAN sharing detector 103 configures RUs, DUs, and CUs of RAN 109 to forward network traffic for one or more first subscriber devices 104 that are associated with the first PLMN identifier and network traffic for one or more second subscriber devices associated with a second PLMN identifier via first operating bands corresponding to the first operating bands value specified by the profile of the received message. In this example, the network traffic for the one or more first subscriber devices and the network traffic for the one or more second subscriber devices share the first operating bands, a same base station, and a same site.

The techniques of the disclosure may enable the provisioning of a network slice at any point before, during, or after configuring RAN 109 for RAN sharing. For example, in some scenarios, RAN 109 may be configured for RAN sharing prior to the provisioning of a network slice or network slice subnet by RAN sharing detector 103. As another example, RAN 109 may be configured for RAN sharing after the provisioning of a network slice or network slice subnet by RAN sharing detector 103.

The foregoing examples were primarily described with respect to the deployment of a RAN slice subnet within RAN 109 in the presence of RAN sharing. However, the techniques of the disclosure may also be applied to the deployment of a core network slice subnet within core network 105, or the deployment of an end-to-end (E2E) network slice in the presence of RAN sharing.

The techniques set forth herein may be applied by any one or more of an NSMF, NSSMF, or communication service management function (CSMF). While in the foregoing example, RAN sharing detector 103 is implemented within SMO 112, the functionality of RAN sharing detector 103 may be implemented in any of a NSMF, NSSMF, or CSMF, for instance. In some examples, RAN sharing detector 103 may implement one or more of a NSSMF, NSMF, or CSMF for RAN 109.

Figure 1B:
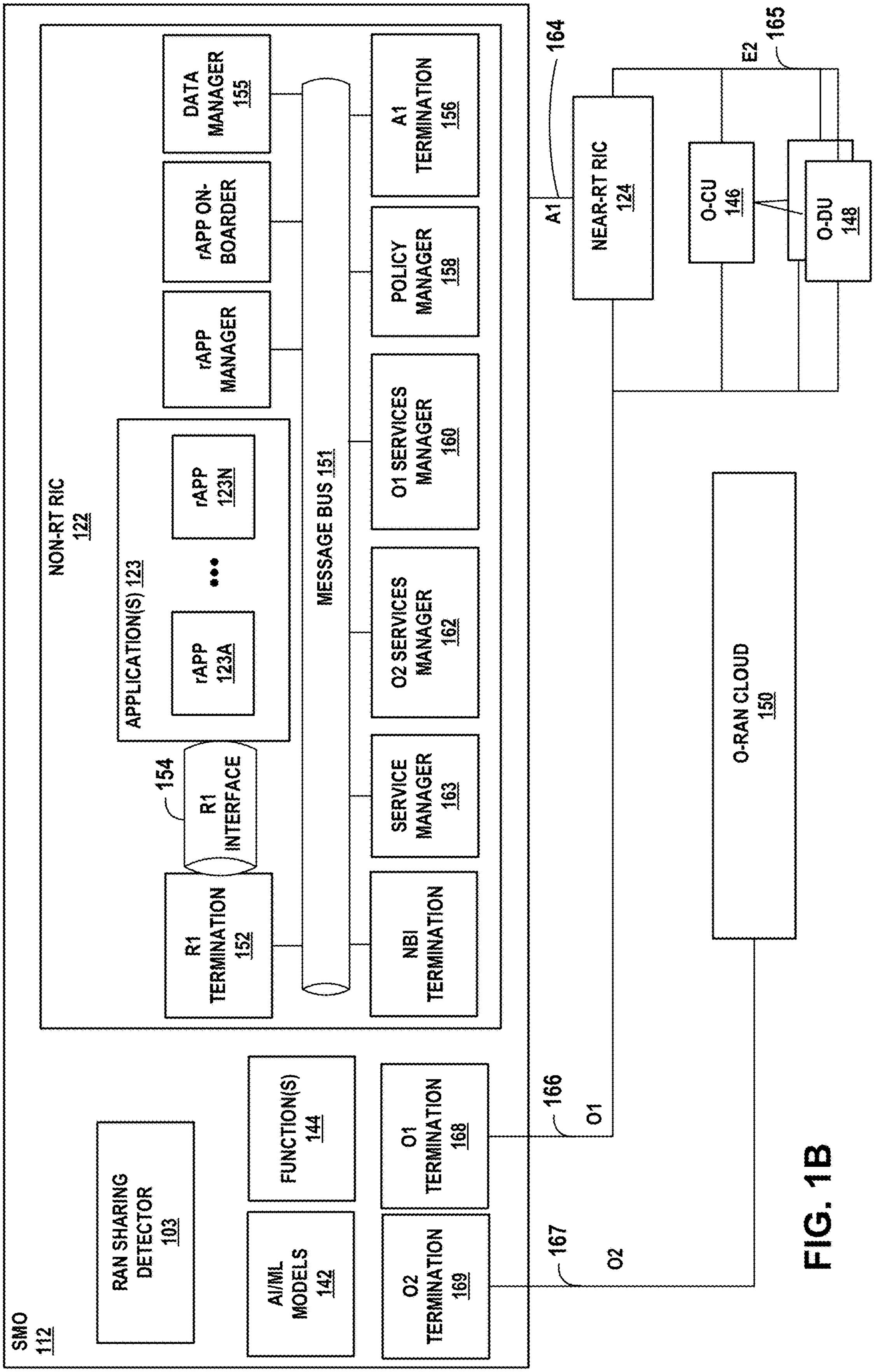
FIG. 1B is a block diagram illustrating further example details of the Non-RT RIC of the Service Management and Orchestration system of FIG. 1A.

FIG. 1B is a block diagram illustrating further example details of the non-RT RIC 122 of FIG. 1A. In the example illustrated in FIG. 1B, SMO 112 may include non-RT RIC 122, one or more AI/ML models 142, one or more functions 144 (e.g., NSSMF, NFMF, and other functions), and open interfaces, such as O1 termination interface 168 and O2 termination interface 169. SMO 112 may manage non-RT RIC 122, near-RT RIC 124, O-RAN managed elements (e.g., centralized unit (O-CU) 146, O-RAN decentralized unit (O-DU) 148 of one or more base stations), and resources in O-RAN cloud 150.

Non-RT RIC 122 may provide non-real-time (e.g., greater than one second) control and optimization of RAN elements and resources such as RUs, DUs, and CUs, workflow management, and policy-based control of applications and features of near-RT RIC 124. Non-RT RIC 122 may be deployed as a highly scalable, microservices based containerized architecture. In this example, non-RT RIC 122 may onboard, deploy, and/or terminate one or more applications, e.g., rApp 123A through rApp 123N (collectively "applications 123"). Applications 123 may represent applications that leverage the functionality exposed via the framework of non-RT RIC 122. Applications 123 may provide non-RT RIC 122 with non-real time (e.g., greater than one second)

control of RAN elements and their resources. Applications 123 may provide services for radio resource management, higher layer procedure optimization, policy optimization, and providing guidance, parameters, policies, and AI/ML models to support the operation of RAN functions.

For example, applications 123 may provide A1 services that provide and facilitate RAN operations and optimization of near-RT RIC 124, such as providing operational guidance (e.g., policies), enrichment information (e.g., forecasts), and AI/ML services. A1 services may include policy management services such as creating, updating, and/or deleting of A1 policies; receiving policy feedback; querying policy types, identifiers, and status; defining which policy types are supported by near-RT RIC 124; and registering applications (xApps) of near-RT RIC 124 to specific policy types. A1 services may include enrichment information services, such as providing data for model training of AI/ML models, such as forecasts and/or data analytics.

Applications 123 may provide O1 services that provide configuration management or performance management of O-RAN managed entities, such as near-RT RIC 124 and/or RAN nodes, e.g., O-CU 146, O-DU 148 (also referred to herein as "E2 nodes"). O1 services may provide configuration management services to create, update, and/or delete configurations to O-RAN managed entities. For example, configuration management services may include provisioning operations (e.g., for NSS and NF provisioning) to create a managed object instance (MOI), obtain MOI attributes, modify MOI attributes, and/or delete the MOI. O1 services may also provide performance management services that monitor the status of elements or components in the O-RAN managed entities. For example, non-RT RIC 122 may create, modify, or delete performance management jobs to receive performance metrics, or send heartbeat messages to monitor the status and/or availability of services of RAN nodes or to send trace messages to monitor link failures. O1 services may also provide file management, such as to push files to the RAN nodes (e.g., software updates, beamforming configuration files, ML models, security certificates, etc.).

Applications 123 may provide O2 services that provide infrastructure management and/or network function deployment of resources in O-RAN cloud 150 (also referred to herein as "O-Cloud 150"). O2 services may provide discovery and administration of O-Cloud resources; Scale-In, Scale-Out of cloud/deployments (e.g., deploying resources with more or less processors); FCAPS of cloud/deployments, software management of cloud platform/deployments; create/delete deployment and associated allocated O-Cloud resources.

Applications 123 may provide service management and exposure (SME) services, data management and exposure (DME) services, and/or other services. SME services may provide services that enable services provided over an internal interface (R1 interface 154) of non-RT RIC 122 and their exposure and extensibility through services including bootstrap, service registration/deregistration or updates to service registration, service discovery or notification, heartbeat, authentication, authorization, etc. Data management and exposure (DME) services may include services that manage data and their exposure between applications 123. For example, applications 123 may have different functions, such as application 123A configured to collect and analyze data, application 123B configured to generate an ML model based on the results of the analysis, and application 123N configured to make a prediction or inference using the ML model and/or to generate controls for RAN nodes based on the prediction or inference. DME services may manage the data shared between applications 123, such as the collection of data, the processing of the data, and/or the advertisement of the data.

Non-RT RIC 122 may include one or more managers to process the A1, O1, O2, SME, DME services, and other services. For example, non-RT RIC 122 may include a policy manager 158, O1 services manager 160, O2 services manager 162, service manager 163, and data manager 155. Non-RT RIC 122 may include other managers, such as an application manager and an application on-boarder, that are configured to manage the installation and deployment of applications 123.

Policy manager 158 is configured to control the deployment of policies (e.g., A1 services). For example, in response to receiving requests for A1 services from applications 123 via R1 interface 154, R1 interface 154 sends the requests to policy manager 158 via message bus 151. Policy manager 158 may process the A1 services and may send the A1 services to A1 termination 156 via message bus 151, which provides the A1 services to near-RT RIC 124 via A1 interface 164. In some examples, the A1 interface may implement an A1AP application protocol based on the O-RAN specifications.

O1 services manager 160 is configured to control the deployment of O1 services for monitoring the performance of near-RT RIC 124 and/or RAN nodes (e.g., O-CU 146, O-DU 148). For example, in response to receiving requests for O1 services for monitoring the performance of near-RT RIC 124 from applications 123 via R1 interface 154, R1 interface 154 sends the requests to O1 services manager 160 via message bus 151. O1 services manager 160 may process the O1 services and may send the O1 services to O1 termination 168, which provides the O1 services to near-RT RIC 124 via O1 interface 166. In some examples, the O1 interface may implement REST/HTTPS APIs and/or NETCONF.

O1 services manager 160 is additionally, or alternatively, configured to control the deployment of O1 services for the configuration of near-RT RIC 124 and/or RAN nodes. For example, in response to receiving requests for O1 services for the configuration of near-RT RIC 124 from applications 123 via R1 interface 154, R1 interface 154 sends the requests to O1 services manager 160. O1 services manager 160 may process the O1 services and may send the O1 services to O1 termination 168, which provides the O1 services to near-RT RIC 124 via O1 interface 166.

O2 services manager 162 may be configured to control the deployment of O2 services for monitoring the performance of resources of O-Cloud 150. For example, in response to receiving requests for O2 services for monitoring the performance of resources within O-Cloud 150 via R1 interface 154, R1 interface 154 sends the request to O2 services manager 162. O2 services manager 162 may process the O2 services and may send the O2 services to O2 termination 169, which provides the O2 services to resources of O-Cloud 150 via O2 interface 167.

O2 services manager 162 may additionally, or alternatively, be configured to control the deployment of O2 services for the configuration of resources of O-Cloud 150. For example, in response to receiving requests for O2 services for configuring resources within O-Cloud 150 from applications 123 via R1 interface 154, R1 interface 154 sends the requests to O2 services manager 162. O2 services manager 162 may process the O2 services and may send the O2 services to O2 termination 169, which provides the O2 services to resources of O-Cloud 150 via O2 interface 167.

In some examples, R1 interface 154 also exposes applications 123 to SME services, DME services, and/or other services. For example, in response to receiving requests for SME services from applications 123 via R1 interface 154, R1 interface 154 sends the requests to service manager 163. Service manager 163 may process the SME services (e.g., register/update a service) and may send the SME services to R1 termination 152, which provides the SME services to applications 123 via R1 interface 154 (e.g., sending response to application regarding service registration, update, or discovery). Similarly, in response to receiving requests for DME services from applications 123 via R1 interface 154, R1 interface 154 sends the requests to data manager 155. Data manager 155 may process the DME services and may send the DME services to R1 termination 152, which provides the DME services to applications 123 via R1 interface 154 (e.g., sending data from application configured as a data producer to application configured as a data consumer).

R1 interface 154 may also expose applications 123 to slice subnet management services, such as RAN NSSMF interfaces to retrieve slice service level agreements (SLAs) and slice topologies, and/or slice management, SLA, and slice performance management notifications to applications 123.

Figure 1C:
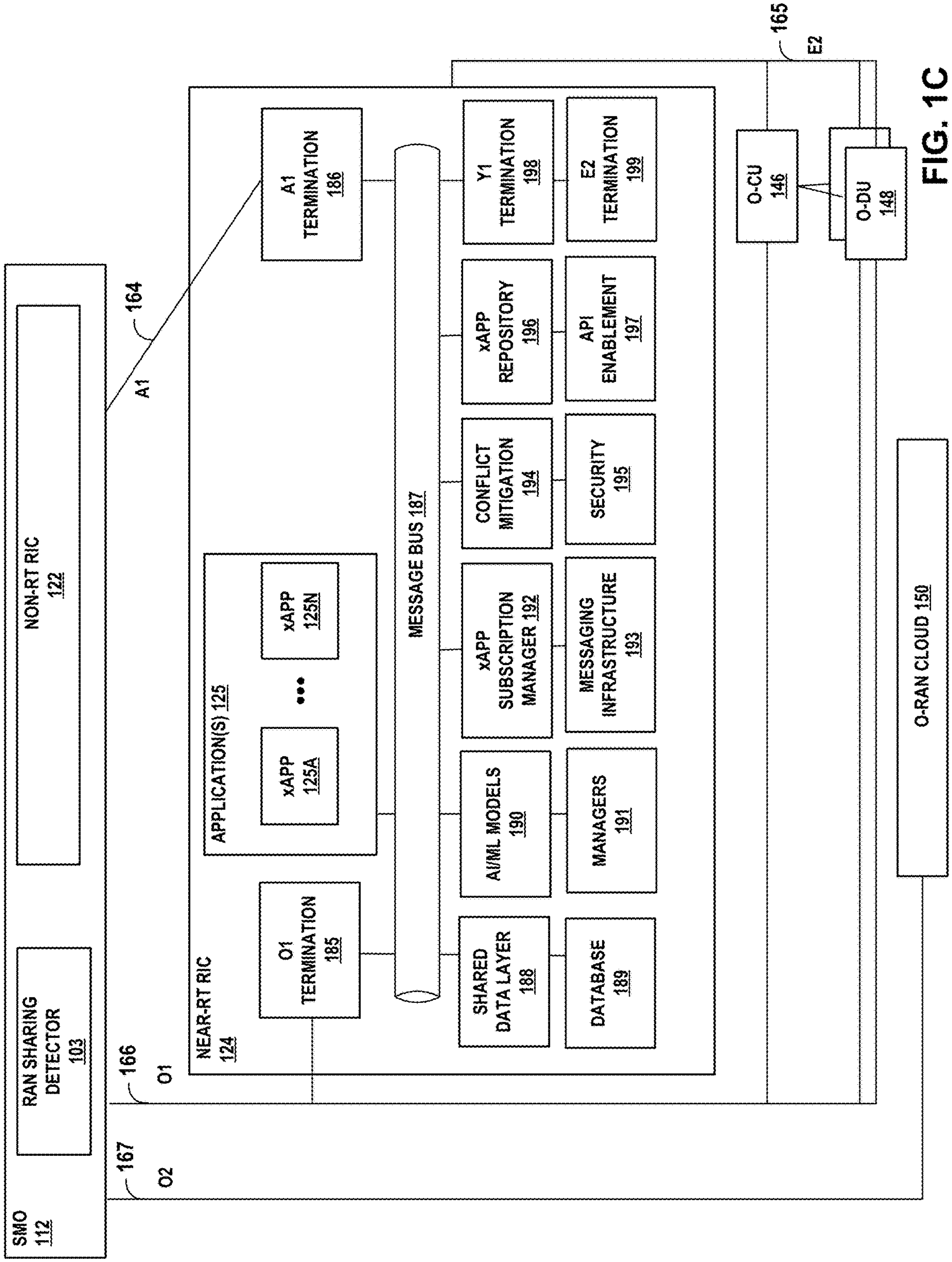
FIG. 1C is a block diagram illustrating further example details of the Near-RT RIC of FIG. 1A.

In accordance with the techniques of the disclosure, RAN sharing detector 103 of SMO 112 may automatically detect the presence of RAN sharing within mobile network 120 of FIGS. 1A-1C and determine a type of the RAN sharing employed within mobile network 120. In one example, RAN sharing detector 103 receives a message for implementing a network slice of RAN 109. In some examples, RAN sharing detector 103 receives the message from an NSMF of mobile core network 105 for RAN 109 of FIG. 1. The message comprises a profile including a first PLMN identifier and a first operating bands value.

RAN sharing detector 103 analyzes one or more fields in one or more data structures of the message to infer that RAN 109 is being shared and/or a RAN sharing type. For example, RAN sharing detector 103 determines that another RAN slice subnet is provisioned within RAN 109 with a second PLMN identifier. Based on the presence of the first PLMN identifier and second PLMN identifier within common RAN 109, RAN sharing detector 103 determines that RAN sharing is employed within mobile network 120. This is because the presence of RAN subnets provisioned with two different PLMN identifiers within RAN 109 indicates that two network operators, corresponding to the two PLMN identifiers, are both using resources of RAN 109.

In a first scenario, RAN sharing detector 103 determines that a second RAN slice subnet provisioned within RAN 109 with the second PLMN identifier has been provisioned with the same first operating bands value as specified in the profile of the message. Because the first PLMN identifier and the second PLMN identifier are configured to use the same first operating bands, RAN sharing detector 103 determines that the RAN sharing type is MOCN. This is because the presence of two different PLMN identifiers indicating use of the same operating bands indicates that two network operators, corresponding to the two PLMN identifiers, are sharing the same operating bands within RAN 109, thereby indicating that MOCN is employed by RAN 109.

In a second scenario, RAN sharing detector 103 determines that there exists no other RAN slice subnet, having a different PLMN identifier than the first PLMN identifier, that has been provisioned with the same first operating bands value within RAN 109. Therefore, because RAN slice subnets are provisioned with different PLMN identifiers (RAN 109 is shared), but such RAN slice subnets do not share the operating bands, RAN sharing detector 103 determines the RAN sharing type is MORAN. This is because the presence of two different PLMN identifiers within RAN 109 indicates that two network operators, corresponding to the two PLMN identifiers, are sharing RAN 109, but because each of the network operators have non-overlapping operating bands, there is no sharing of operating bands, thereby indicating that MORAN is employed by RAN 109.

RAN sharing detector 103 may manage network slices in the RAN based on the determined RAN sharing type. For example, RAN sharing detector 103 may configure one or more network devices, such as RUs, DUs, and CUs of RAN 109, to forward network traffic for one or more subscriber devices 104 in accordance with the determined RAN sharing type. RAN sharing detector 103 selects configuration profiles or templates for provisioning a network slice or a slice subnet based at least in part on the determined RAN sharing type and the profile. In addition, RAN sharing detector 103 may apply one or more network policies or SLA policies for provisioning the slice subnet based at least in part on the determined RAN sharing type. Furthermore, RAN sharing detector 103 may allocate resources to the slice subnet based at least in part on the determined RAN sharing type.

In a first example, RAN sharing detector 103 configures one or more network devices, such as RUs, DUs, and CUs of RAN 109, to forward network traffic for one or more subscriber devices 104 in accordance with a determined RAN sharing type of MORAN. In this example, RAN sharing detector 103 configures RUs, DUs, and CUs of RAN 109 to forward network traffic for one or more first subscriber devices 104 that are associated with the first PLMN identifier. In particular, RAN sharing detector 103 configures RUs, DUs, and CUs of RAN 109 to forward network traffic for the one or more first subscriber devices via first operating bands corresponding to the first operating bands value specified by the profile of the received message. In addition, RAN sharing detector 103 configures RUs, DUs, and CUs of RAN 109 to forward network traffic for one or more second subscriber devices associated with a second PLMN identifier via second operating bands different from the first operating bands. In this example, the network traffic for the one or more first subscriber devices and the network traffic for the one or more second subscriber devices share a same base station and a same site.

In a second example, RAN sharing detector 103 configures one or more network devices, such as RUs, DUs, and CUs of RAN 109, to forward network traffic for one or more subscriber devices 104 in accordance with a determined RAN sharing type of MOCN. In this example, RAN sharing detector 103 configures RUs, DUs, and CUs of RAN 109 to forward network traffic for one or more first subscriber devices 104 that are associated with the first PLMN identifier and network traffic for one or more second subscriber devices associated with a second PLMN identifier via first operating bands corresponding to the first operating bands value specified by the profile of the received message. In this example, the network traffic for the one or more first subscriber devices and the network traffic for the one or more second subscriber devices share the first operating bands, a same base station, and a same site.

FIG. 1C is a block diagram illustrating further example details of the Near-RT RIC of FIG. 1A. In the example illustrated in FIG. 1C, near-RT RIC 124 includes shared data layer 188, database 189, one or more AI/ML models 190, managers 191, xApp subscription manager 192, messaging infrastructure 193, conflict mitigation 194, security 195, xApp repository 196, message bus 187, API enablement 197, and open interfaces, such as O1 termination 185, A1 termination 186, Y1 termination 198, and E2 termination 199.

Near-RT RIC 124 can provide near-real-time (e.g., milliseconds) control and optimization of RAN elements and resources, such as O-CU 146 and/or O-DU 148, via fine-grained data collection and actions performed via E2 interface 165. For example, near-RT RIC 124 may onboard one or more applications 125 (e.g., xApps 125A-125N of FIG. 1C, collectively, "xApps 125") that provide near-real time control of RAN elements and their resources.

Near-RT RIC 124 may be deployed as a highly scalable, microservices based containerized architecture. Near-RT RIC 124 may onboard one or more applications, e.g., applications 125 (e.g., xApps 125) that manage near-real time events within near-RT RIC 124. Applications 125 may leverage the functionality exposed via the near-RT RIC framework of near-RT RIC 124. Near-RT RIC 124 may enforce policies received from applications 123 of non-RT RIC 122 and may provide policy feedback to non-RT RIC 122. Although illustrated as within near-RT RIC 124, any one or more of applications 125 may be executed by a third party, separate from near-RT RIC 124.

Shared Data Layer 188 and database 189 enable near-RT RIC 124 to maintain and expose RAN/UE information and other information required to support specific use cases. In some examples, database 189 maintains a list of UEs and associated data, and perform tracking and correlation of the UE identities associated with the connected E2 Nodes. In some examples, database 189 maintains configurations and near real-time information relating to connected E2 Nodes and the mappings between them. In some examples, Shared Data Layer 188 and database 189. Such information may be generated and accessed by near-RT RIC 124 or authorized xApps 125. Shared Data Layer 188 provides SDL services for xApps 125, which can be used to subscribe to database notifications and to read, write and modify information stored on database 189. Use-case specific information may be exposed using the services provided by Shared Data Layer 188.

Managers 191 include OAM management, which provides fault, configuration, accounting, performance, file, security and other management plane services. Managers 191 of near-RT RIC 124 provide several capabilities to support OAM management services. For example, managers 191 provide fault management, including Near-RT RIC Fault Supervision MnS over the O1 interface. Further, managers 191 provide configuration management, including Near-RT RIC Provisioning MnS over the O1 interface.

In some examples, managers 191 perform logging, tracing, and metrics collection functions. Logging is to capture information needed to operate, troubleshoot and report on the performance of near-RT RIC 124 and its constituent components. Log records may be viewed and consumed directly by users and systems, indexed and loaded into a data storage, and used to compute metrics and generate reports. Near-RT RIC components log events according to a common logging format. Different logs can be generated (e.g., audit log, metrics log, error log and debug log). Tracing mechanisms are used to monitor the transactions or a workflow. An example subscription workflow can be broken into two traces namely, a subscription request trace followed by a response trace. Individual traces can be analyzed to understand timing latencies as the workflow traverses a particular Near-RT RIC component. Metrics are collected and reported for performance and fault management specific to each xApp logic and other internal functionalities are collected and published for authorized consumer (e.g., SMO).

Near-RT RIC 124 includes xApp subscription manager 192. xApp subscription manager 192 enables near-RT RIC 124 to handle subscription requests from different xApps 125 for, e.g., E2-related data, and provides unified data distribution to xApps 125 for those data. xApp subscription manager 192, in some examples, manages subscriptions from xApps to E2 nodes. xApp subscription manager 192 may enforce authorization of policies controlling xApp 125 access to messages. Further, xApp subscription manager 192 enables merging of identical subscriptions from different xApps 125 into a single subscription toward an E2 Node.

Conflict mitigation 194 enables near-RT RIC 124 to detect and resolve potentially overlapping or conflicting requests from multiple xApps 125. In the context of near-RT RIC 124, conflict mitigation 194 addresses conflicting interactions between different xApps 125. An application may change one or more parameters with the objective of optimizing a specific metric. Conflict mitigation 194 may reduce, mitigate, or avoid instances wherein xApps 125 chose or configure objectives such that they result in conflicting actions.

Messaging infrastructure 193 enables near-RT RIC 124 with low-latency message delivery between Near-RT RIC internal endpoints. Messaging infrastructure 193 supports registration of endpoints, wherein endpoints register themselves to messaging infrastructure 193. Messaging infrastructure 193 further supports discovery of endpoints, wherein endpoints are discovered by messaging infrastructure 193 initially and registered to messaging infrastructure 193. Messaging infrastructure 193 also supports deletion of endpoints, wherein endpoints are deleted once they are not used anymore. Messaging infrastructure 193 may provide an API for sending messages to messaging infrastructure 193 and an API for receiving messages from messaging infrastructure 193. Messaging infrastructure 193 supports multiple messaging modes, e.g., point-to-point mode (e.g., message exchange among endpoints), publish/subscribe mode (e.g., real-time data dispatching from E2 termination 199 to multiple subscriber xApps 125). Messaging infrastructure 193 provides message routing, namely according to the message routing information, messages can be dispatched to different endpoints. Messaging infrastructure 193 supports message robustness to avoid data loss during a messaging infrastructure outage/restart or to release resources from the messaging infrastructure once a message is outdated.

Near-RT RIC 124 includes security 195. Security 195 prevent malicious xApps 125 from abusing radio network information (e.g., exporting to unauthorized external systems) and/or control capabilities over RAN functions.

Near-RT RIC 124 includes termination for various interfaces, including E2 termination 199, A1 termination 186, O1 termination 185, and Y1 termination 198. E2 termination 199 enables termination of an E2 interface. E2 termination 199 may terminate an SCTP connection from each E2 Node. E2 termination 199 may also route messages from xApps 125 through the SCTP connection to an E2 Node. E2 termination 199 may further decode the payload of an incoming ASN.1 message enough to determine message type. In some examples, E2 termination 199 handles incoming E2 messages related to E2 connectivity and receives and responds to an E2 Setup Request from an E2 Node. Furthermore, E2 termination 199 may notify xApps 125 of a list of RAN functions supported by an E2 Node based on information derived from the E2 Setup and RIC Service Update procedures, and may notify the newly connected E2 Node of the list of accepted functions.

A1 termination 186 enables termination of the A1 interface. A1 termination 186 provides a generic API by means of which Near-RT RIC 124 can receive and send messages via an A1 interface. These include, e.g., A1 policies and enrichment information received from Non-RT RIC 122, or A1 policy feedback sent towards Non-RT RIC 122. A1 termination 186 may further send an A1 policy that is set or updated by Non-RT RIC 122 to suitable xApp(s) 125 based on a list of candidate xApps 125 provided by xApp Repository 196.

O1 termination 185 enables termination of the O1 interface. Near-RT RIC 124 communicates with SMO 112 via O1 interface 166 and exposes O1-related management services from Near-RT RIC 124. For O1 management services (MnS), near-RT RIC 124 is an MnS producer and SMO 112 is an MnS consumer. Near-RT RIC 124 exposes provisioning management services from Near-RT RIC 124 to an O1 provisioning management service consumer, translates O1 management services to internal APIs of near-RT RIC 124, exposing FM services to report faults and events from near-RT RIC 124 to an O1 FM service consumer, exposes PM services to report bulk and real-time PM data from near-RT RIC 124 to an O1 PM service consumer, exposes file management services to download ML files, software files, etc. and upload log/trace files to/from file MnS consumer, and exposes communication surveillance services to the O1 communication surveillance service consumer.

Y1 termination 198 enables termination of the Y1 interface. Y1 termination 198 provides support for exposing RAN analytics information from Near-RT RIC 124 to Y1 consumers.

Near-RT RIC 124 may include one or more managers to process the O1, A1, Y1, and E2 services, and other services. Near-RT RIC 124 may include other managers, such as an application manager and an application on-boarder, that are configured to manage the installation and deployment of applications 125.

API enablement 197 provide APIS for near-RT RIC 124. The near-RT RIC APIs can be categorized based on the interaction with near-RT RIC 124 and can be related to E2-related services, A1-related services, Management related services, and SDL services. This functionality provides support for registration, discovery and consumption of near-RT RIC APIs within the near-RT RIC scope. In particular, API enablement 197 provides services including repository and registry services for near-RT RIC APIs, services that allow discovery of the registered near-RT RIC APIs, services to authenticate xApps 125 for use of the near-RT RIC APIs, services that enable generic subscription and event notification, and functionality to avoid compatibility clashes between xApps 125 and the services they access. In some examples, API enablement 197 provides API enablement services that are accessed by xApps 125 via one or more enablement APIs.

AI/ML models 190 enables near-RT RIC 124 with data pipelining, model management, training and inference, which constitute complete AI/ML workflow support for xApps 125 to implement AI/ML algorithms. xApps 125 may use none, part, or all of this functionality, depending on its design. In some examples, AI/ML models 190 include data pipelining, which performs data ingestion and preparation for xApps 125. AI/ML models 190 may provide generic and use case-independent capabilities to AI/ML-based xApps 125 that may be useful to multiple use cases. The input data for training may come from an xApp-specific space (e.g., dedicated space in database).

xApp Repository 196 maintaining a list of candidate xApp(s) to A1 Termination 186 for sending A1 policy or policy update to suitable xApp(s) 125 based on policy type and operator policies. In addition, xApp Repository 196 maintains the policy types supported in near-RT RIC 124. The supported policy types are based on policy types supported by the registered xApps 125 and operator policies. Further, xApp Repository 196 performs xApp access control to requested A1-EI type based on operator policies.

In accordance with the techniques of the disclosure, RAN sharing detector 103 of SMO 112 may automatically detect the presence of RAN sharing within mobile network 120 of FIGS. 1A-IC and determine a type of the RAN sharing employed within mobile network 120. In one example, RAN sharing detector 103 receives a message for implementing a network slice of RAN 109. In some examples, RAN sharing detector 103 receives the message from an NSMF of mobile core network 105 for RAN 109 of FIG. 1. The message comprises a profile including a first PLMN identifier and a first operating bands value.

RAN sharing detector 103 analyzes one or more fields in one or more data structures of the message to infer that RAN 109 is being shared and/or a RAN sharing type. For example, RAN sharing detector 103 determines that another RAN slice subnet is provisioned within RAN 109 with a second PLMN identifier. Based on the presence of the first PLMN identifier and second PLMN identifier within common RAN 109, RAN sharing detector 103 determines that RAN sharing is employed within mobile network 120. This is because the presence of RAN subnets provisioned with two different PLMN identifiers within RAN 109 indicates that two network operators, corresponding to the two PLMN identifiers, are both using resources of RAN 109.

In a first scenario, RAN sharing detector 103 determines that a second RAN slice subnet provisioned within RAN 109 with the second PLMN identifier has been provisioned with the same first operating bands value as specified in the profile of the message. Because the first PLMN identifier and the second PLMN identifier are configured to use the same first operating bands, RAN sharing detector 103 determines that the RAN sharing type is MOCN. This is because the presence of two different PLMN identifiers indicating use of the same operating bands indicates that two network operators, corresponding to the two PLMN identifiers, are sharing the same operating bands within RAN 109, thereby indicating that MOCN is employed by RAN 109.

In a second scenario, RAN sharing detector 103 determines that there exists no other RAN slice subnet, having a different PLMN identifier than the first PLMN identifier, that has been provisioned with the same first operating bands value within RAN 109. Therefore, because RAN slice subnets are provisioned with different PLMN identifiers (RAN 109 is shared), but such RAN slice subnets do not share the operating bands, RAN sharing detector 103 determines the RAN sharing type is MORAN. This is because the presence of two different PLMN identifiers within RAN 109 indicates that two network operators, corresponding to the two PLMN identifiers, are sharing RAN 109, but because each of the network operators have non-overlapping operating bands, there is no sharing of operating bands, thereby indicating that MORAN is employed by RAN 109.

RAN sharing detector 103 may manage network slices in the RAN based on the determined RAN sharing type. For example, RAN sharing detector 103 may configure one or more network devices, such as RUs, DUs, and CUs of RAN 109, to forward network traffic for one or more subscriber devices 104 in accordance with the determined RAN sharing type. RAN sharing detector 103 selects configuration profiles or templates for provisioning a network slice or a slice subnet based at least in part on the determined RAN sharing type and the profile. In addition, RAN sharing detector 103 may apply one or more network policies or SLA policies for provisioning the slice subnet based at least in part on the determined RAN sharing type. Furthermore, RAN sharing detector 103 may allocate resources to the slice subnet based at least in part on the determined RAN sharing type.

In a first example, RAN sharing detector 103 configures one or more network devices, such as RUs, DUs, and CUs of RAN 109, to forward network traffic for one or more subscriber devices 104 in accordance with a determined RAN sharing type of MORAN. In this example, RAN sharing detector 103 configures RUs, DUs, and CUs of RAN 109 to forward network traffic for one or more first subscriber devices 104 that are associated with the first PLMN identifier. In particular, RAN sharing detector 103 configures RUs, DUs, and CUs of RAN 109 to forward network traffic for the one or more first subscriber devices via first operating bands corresponding to the first operating bands value specified by the profile of the received message. In addition, RAN sharing detector 103 configures RUs, DUs, and CUs of RAN 109 to forward network traffic for one or more second subscriber devices associated with a second PLMN identifier via second operating bands different from the first operating bands. In this example, the network traffic for the one or more first subscriber devices and the network traffic for the one or more second subscriber devices share a same base station and a same site.

In a second example, RAN sharing detector 103 configures one or more network devices, such as RUs, DUs, and CUs of RAN 109, to forward network traffic for one or more subscriber devices 104 in accordance with a determined RAN sharing type of MOCN. In this example, RAN sharing detector 103 configures RUs, DUs, and CUs of RAN 109 to forward network traffic for one or more first subscriber devices 104 that are associated with the first PLMN identifier and network traffic for one or more second subscriber devices associated with a second PLMN identifier via first operating bands corresponding to the first operating bands value specified by the profile of the received message. In this example, the network traffic for the one or more first subscriber devices and the network traffic for the one or more second subscriber devices share the first operating bands, a same base station, and a same site.

The foregoing examples of FIGS. 1A-1C depict an example implementation of an O-RAN network system that uses the techniques disclosed herein. However, other network infrastructures, such as 3GPP, may be used to implement the techniques disclosed herein.

Figure 1D:
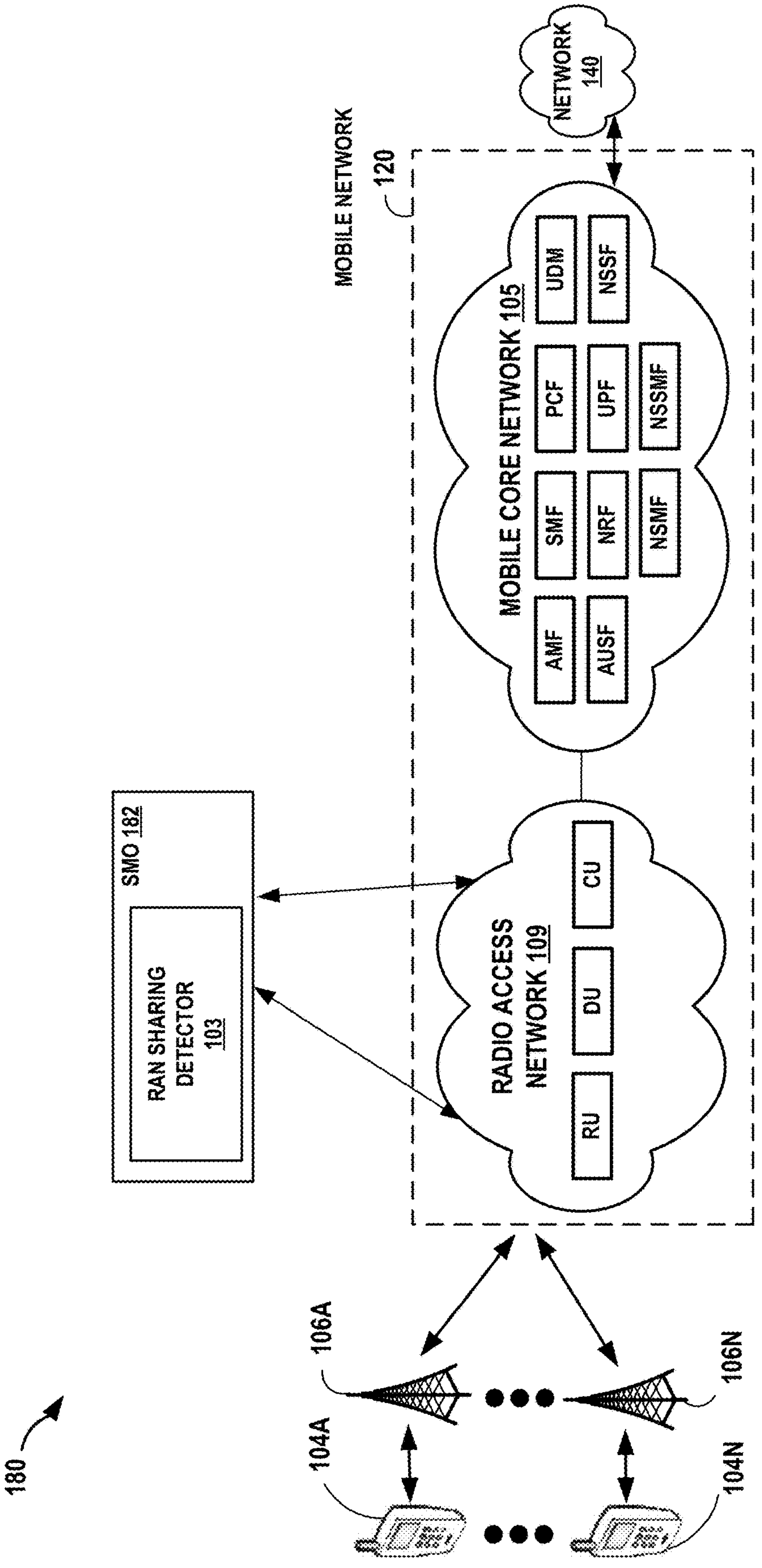
FIG. 1D is another block diagram illustrating an example network system configured to detect the presence of mobile network sharing, in accordance with one or more techniques of the disclosure.
Figure 1E:
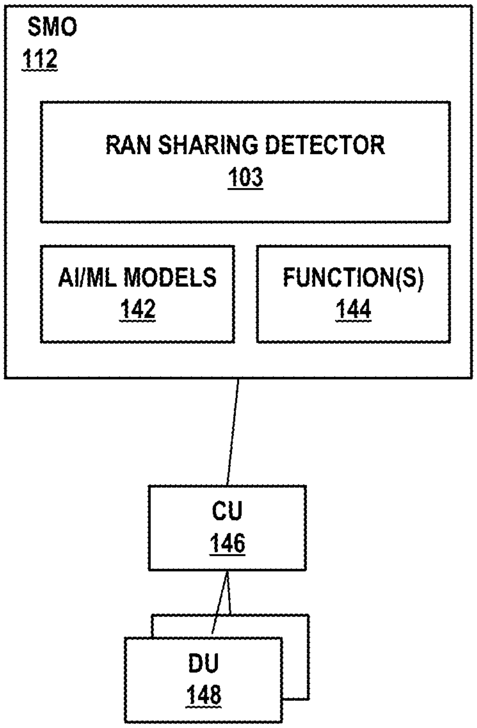
FIG. 1E is a block diagram illustrating further example details of the Service Management and Orchestration system of FIG. 1D.

FIG. 1D is another block diagram illustrating an example network system configured to detect the presence of mobile network sharing, in accordance with one or more techniques of the disclosure. FIG. 1E is a block diagram illustrating further example details of the Service Management and Orchestration system 182 of FIG. 1D. More specifically, the example of FIGS. 1D-1E depicts an example mobile network system 180 that implements a 3GPP mobile network infrastructure to detect the presence of mobile network sharing, in accordance with one or more techniques of the disclosure. SMO system 182 may provide service management and orchestration to manage and/or monitor aspects of a RAN and/or 5G core. SMO system 182 may operate in a substantially similar fashion as SMO 112 of FIGS. 1A-IC, except that SMO 182 may operate in accordance with 3GPP, rather than O-RAN.

For example, with respect to FIGS. 1D-IE, RAN sharing detector 103 of SMO 112 receives a message for implementing a network slice of RAN 109. In some examples, RAN sharing detector 103 receives the message from an NSMF of mobile core network 105 for RAN 109. The message comprises a profile including a first PLMN identifier and a first operating bands value.

RAN sharing detector 103 determines whether another RAN slice subnet is provisioned with a second PLMN identifier within RAN 109. For example, RAN sharing detector 103 analyzes one or more fields in one or more data structures of the message to determine whether another RAN slice subnet is provisioned with a second PLMN identifier within RAN 109. Based on the presence of only the first PLMN identifier and not a second PLMN identifier within common RAN 109, RAN sharing detector 103 determines that RAN sharing is not employed within mobile network 120. This is because the absence of RAN subnets provisioned with two different PLMN identifiers within RAN 109 indicates that there is only a single network operator, corresponding to the first PLMN identifier, is using resources of RAN 109.

Based on the presence of the first PLMN identifier and the second PLMN identifier within common RAN 109, RAN sharing detector 103 determines that RAN sharing is employed within mobile network 120. This is because the presence of RAN subnets provisioned with two different PLMN identifiers within RAN 109 indicates that two network operators, corresponding to the two PLMN identifiers, are both using resources of RAN 109.

RAN sharing detector 103 determines whether another RAN slice subnet is provisioned within RAN 109 with a different PLMN identifier and having the same first operating bands value as specified in the profile of the message.

In response to determining that a second RAN slice subnet is provisioned within RAN 109 with a second PLMN identifier and having the same first operating bands value as specified in the profile of the message, RAN sharing detector 103 determines that a RAN sharing type is MOCN. This is because the presence of two different PLMN identifiers indicating use of the same operating bands indicates that two network operators, corresponding to the two PLMN identifiers, are sharing the same operating bands within RAN 109, thereby indicating that MOCN is employed by RAN 109.

In response to determining another RAN slice subnet has not been provisioned within RAN 109 with a different PLMN identifier and having the same first operating bands value as specified in the profile of the message, RAN sharing detector 103 determines whether there are no other RAN slice subnets, having different PLMN identifiers than the first PLMN identifier, that have been provisioned with the same first operating bands value within RAN 109.

In response to determining that there are no other RAN slice subnets, having different PLMN identifiers than the first PLMN identifier, that have been provisioned within RAN 109 with the same first operating bands value within RAN 109, RAN sharing detector 103 determines the RAN sharing type is MORAN. This is because the presence of two different PLMN identifiers within RAN 109 indicates that two network operators, corresponding to the two PLMN identifiers, are sharing RAN 109, but because each of the network operators have non-overlapping operating bands, there is no sharing of operating bands, thereby indicating that MORAN is employed by RAN 109. Otherwise, RAN sharing detector 103 determines that some other type of RAN sharing is in use by RAN 109.

RAN sharing detector 103 manages the network slice in RAN 109 based on the determined RAN sharing type. For example, RAN sharing detector 103 may configure one or more network devices of RAN 109 to forward network traffic for one or more subscriber devices 104 in accordance with the determined RAN sharing type. In some examples, RAN sharing detector 103 provisions at least one of a RAN slice subnet within RAN 109 or a core network slice subnet within core network 105 in accordance with the profile of the message and the determined RAN sharing type.

Figure 2:
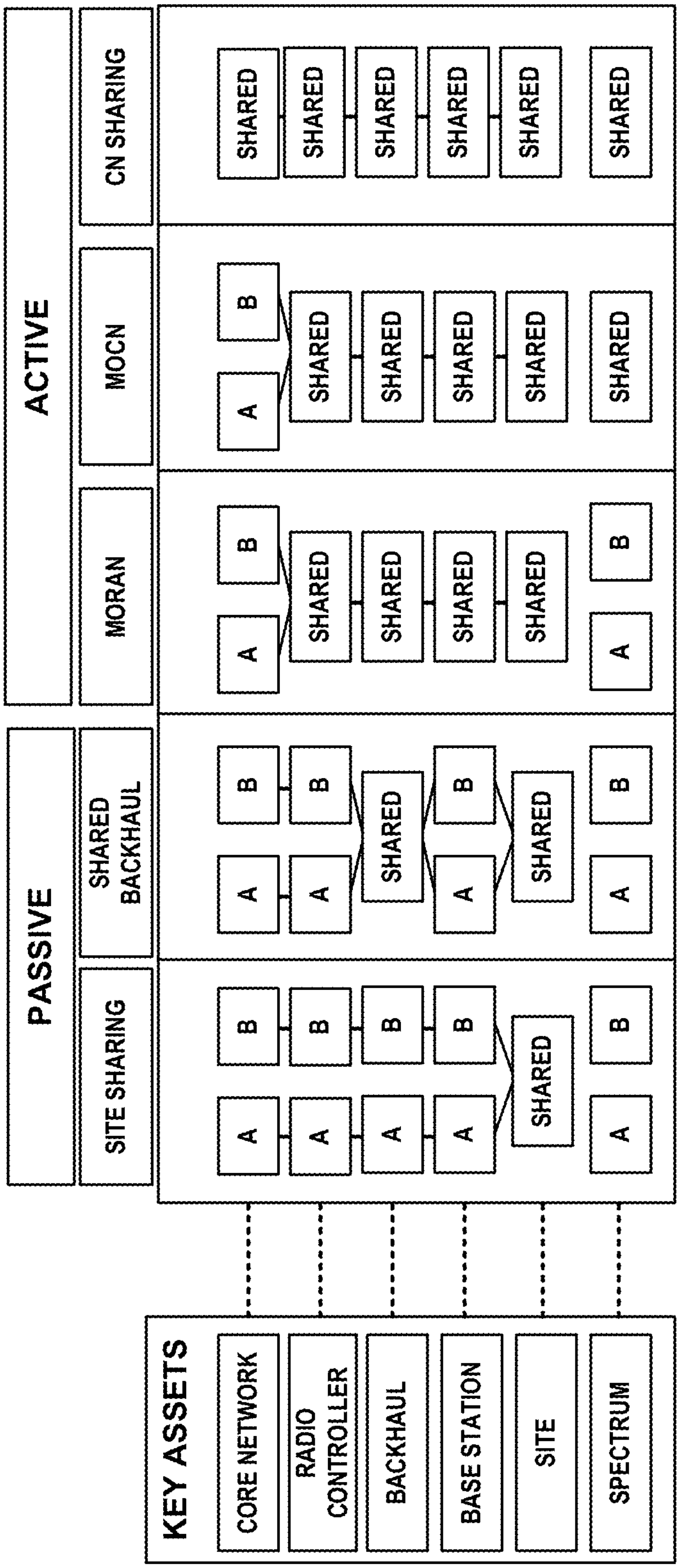
FIG. 2 is a block diagram illustrating a set of examples of RAN sharing.

FIG. 2 a block diagram illustrating a set of examples of RAN sharing. RAN sharing, as described herein, refers to the sharing of infrastructure ("key assets) for a RAN, such as a core network, a radio controller, a backhaul network, a base station, a site, and/or a spectrum between two or more network operators of the RAN. (Such sharing may be for many instances of each of the above types of infrastructure.) Approaches for RAN sharing may be organized into two categories, passive and active. Passive RAN sharing techniques include site-sharing and shared backhaul networks. Active RAN sharing techniques include MORAN, MOCN, and core network (CN) sharing. Where active RAN sharing is used, the techniques of the disclosure automatically detect slices for the RAN sharing scenarios of MORAN, MOCN and CN sharing.

In MORAN, two network operations use different core networks and different frequency spectrums, but share a radio controller, a backhaul network, a base station, and a site. In MOCN, two network operations use different core networks but share a radio controller, a backhaul network, a base station, a site, and a frequency spectrums. The main difference between MORAN and MOCN is that, in MORAN, the network operators use different spectrums, whereas in MOCN, the network operators share a common spectrum. In CN sharing, the network operations share all infrastructure of the RAN, including both the core network and the spectrum.

Figure 3:
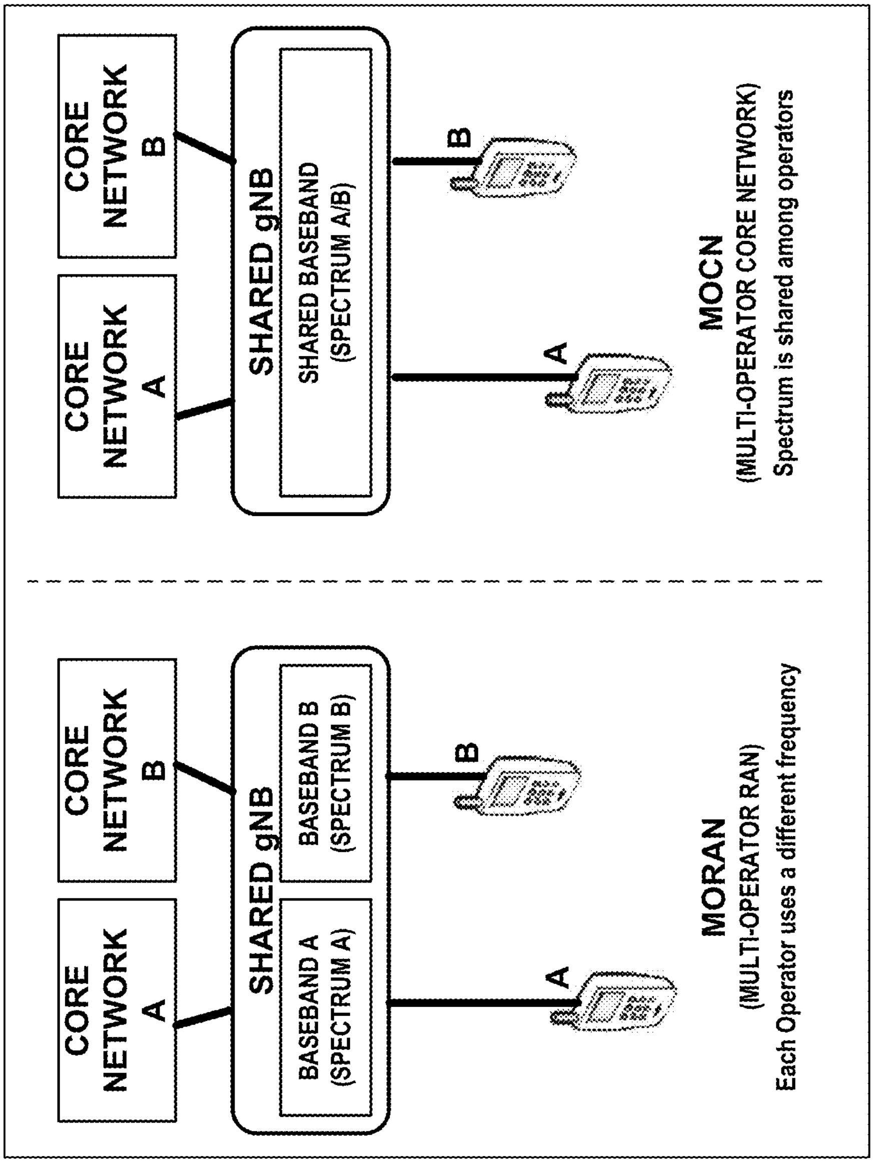
FIG. 3 is a block diagram illustrating another set of examples of RAN sharing.

FIG. 3 is a block diagram illustrating another set of examples of RAN sharing. In MORAN, Operator A and Operator B have different core networks A and B, respectively. Operator A and Operator B share the gNB, but use separate baseband spectrums. In MOCN, Operator A and Operator B have different core networks A and B, respectively. Operator A and Operator B share the gNB as well as share a spectrum.

Figure 4:
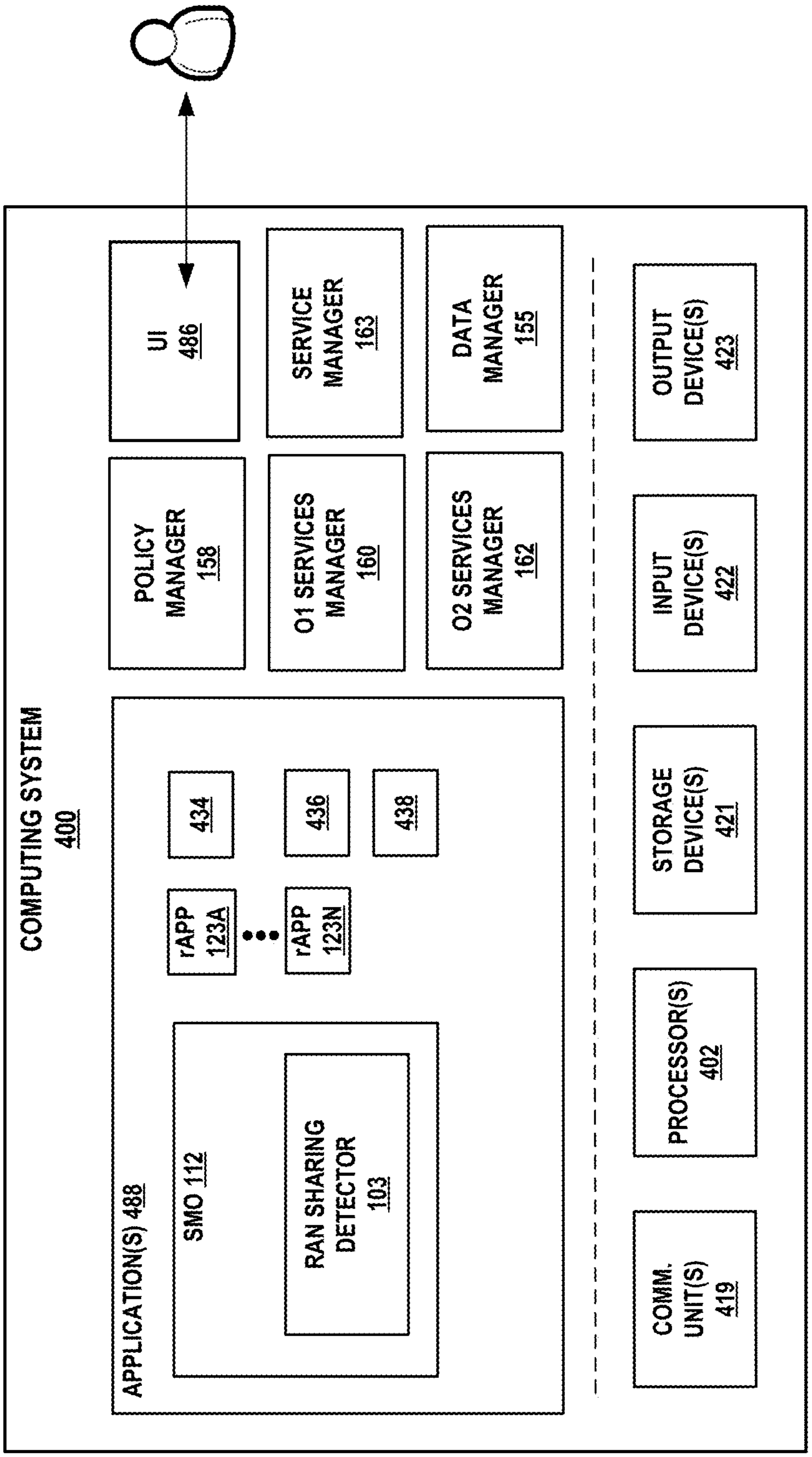
FIG. 4 is a block diagram illustrating an example computing system in detail, in accordance with the techniques of this disclosure.

FIG. 4 is a block diagram illustrating an example computing system 400 in detail, in accordance with the techniques of this disclosure. In this example of FIG. 2, computing system 400 may implement, for example, an SMO 112 and/or a non-real time RIC, such as non-RT RIC 122 of FIGS. 1A-IC.

Computing system 400 includes processing circuitry 220, one or more input devices 422, one or more output devices 423, one or more communication units 419, and one or more storage device(s) 421. In some examples, computing system 400 is a cloud computing system, server farm, and/or server cluster (or portion thereof) that provides services to client devices and other devices or systems. In other examples, computing system 400 may be implemented through one or more virtualized compute instances (e.g., virtual machines, containers) of a data center, cloud computing system, server farm, and/or server cluster.

One or more of the devices, modules, storage areas, or other components of computing system 400 may be interconnected to enable inter-component communications (physically, communicatively, and/or operatively). In some examples, such connectivity may be provided by communication channels, a system bus (e.g., message bus 151 of FIG. 1B), a network connection, an inter-process communication data structure, or any other method for communicating data.

Processing circuitry 220 of computing system 400 may implement functionality and/or execute instructions associated with an SMO and/or a non-RT RIC or associated with one or more modules illustrated herein and/or described herein, including applications 488, policy manager 158, O1 services manager 160, O2 services manager 162, service manager 163, and data manager 155. Processing circuitry 220 may be, may be part of, and/or may include processing circuitry that performs operations in accordance with one or more aspects of the present disclosure. Examples of processing circuitry 220 include microprocessors, application processors, display controllers, auxiliary processors, one or more sensor hubs, and any other hardware configured to function as a processor, a processing unit, or a processing device. Computing system 400 may use processing circuitry 220 to perform operations in accordance with one or more aspects of the present disclosure using software, hardware, firmware, or a mixture of hardware, software, and firmware residing in and/or executing at computing system 400. Any one or more of applications 488, policy manager 158, O1 services manager 160, O2 services manager 162, service manager 163, and data manager 155 may be hosted by a cloud provider or other third-party.

One or more communication units 419 of computing system 400 may communicate with devices external to computing system 400 by transmitting and/or receiving data, and may operate, in some respects, as both an input device and an output device. In some examples, communication units 419 may communicate with other devices over a network. In other examples, communication units 419 may send and/or receive radio signals on a radio network such as a cellular radio network. In other examples, communication units 419 of computing system 400 may transmit and/or receive satellite signals on a satellite network such as a Global Positioning System (GPS) network. Examples of communication units 419 include a network interface card (e.g., an Ethernet card), an optical transceiver, a radio frequency transceiver, a GPS receiver, or any other type of device that can send and/or receive information. Other examples of communication units 419 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 422 may represent any input devices of computing system 400 not otherwise separately described herein. One or more input devices 422 may generate, receive, and/or process input from any type of device capable of detecting input from a human or machine. For example, one or more input devices 422 may generate, receive, and/or process input in the form of electrical, physical, audio, image, and/or visual input (e.g., peripheral device, keyboard, microphone, camera).

One or more output devices 423 may represent any output devices of computing system 400 not otherwise separately described herein. One or more output devices 423 may generate, receive, and/or process input from any type of device capable of detecting input from a human or machine. For example, one or more output devices 423 may generate, receive, and/or process output in the form of electrical and/or physical output (e.g., peripheral device, actuator). In some examples, output devices 423 provide UI 486 with which an administrator may interact with computing system 400.

One or more storage device(s) 421 within computing system 400 may store information for processing during operation of computing system 400. Storage device(s) 421 may store program instructions and/or data associated with one or more of the modules described in accordance with one or more aspects of this disclosure. Processing circuitry 220 and one or more storage device(s) 421 may provide an operating environment or platform for such modules, which may be implemented as software, but may in some examples include any combination of hardware, firmware, and software. Processing circuitry 220 may execute instructions and one or more storage device(s) 421 may store instructions and/or data of one or more modules. The combination of processing circuitry 220 and storage device(s) 421 may retrieve, store, and/or execute the instructions and/or data of one or more applications, modules, or software. Processing circuitry 220 and/or storage device(s) 421 may also be operably coupled to one or more other software and/or hardware components, including, but not limited to, one or more of the components of computing system 400 and/or one or more devices or systems illustrated as being connected to computing system 400.

In some examples, one or more storage device(s) 421 are temporary memories, meaning that a primary purpose of the one or more storage devices is not long-term storage. Storage device(s) 421 of computing system 400 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Storage device(s) 421, in some examples, also include one or more computer-readable storage media. Storage device(s) 421 may be configured to store larger amounts of information than volatile memory. Storage device(s) 421 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Applications 488 may include SMO 112 and rApps 123A. SMO 112 provides orchestration, control management, and automation aspects of RAN 109 (e.g., network slicing, management, and orchestration of O-Cloud, etc.). Further, SMO 112 may control aspects of non-RT RIC 122 of FIGS. 1A-IC and near-RT RIC 124 of FIGS. 1A-IC.

As described above, rApps 123 may manage non-real time events within non-RT RIC 122, such as applications that do not require response times of less than one second. rApps 123 may leverage the functionality exposed via a non-RT RIC framework of computing device 400. rApps 123 may be used to control and manage RAN elements and resources, such as a near-RT RIC, RAN nodes, and/or resources in the O-RAN cloud. rApps 123 may provide one or more services that are performed using interfaces of computing system 400 (e.g., A1 interface, O1 interface, O2 interface, etc.). Examples of rApps 123 may include, e.g., services such as policies 1 for a near-RT RIC, configuration instructions 434 for O-RAN managed elements, performance jobs 436 for O-RAN managed elements, services for managing the services and/or data 438, etc.

Computing system 400 may include one or more modules or units configured to perform one or more services or functions of applications 488, such as policy manager 158, O1 services manager 160, O2 services manager 162, service manager 163, and data manager 155, as described above.

For example, policy manager 158 is configured to control the deployment of policies (e.g., A1 services). For example, policy manager 158 may receive requests for A1 services from applications 123 (e.g., via R1 interface 154 of FIG. 1B), process the A1 services from applications 123, and perform the A1 services for a near-RT RIC using an A1 interface (e.g., A1 interface 164 of FIG. 1B). In some examples, the A1 interface may implement an A1AP application protocol based on the 3GPP framework.

O1 services manager 160 is configured to control the deployment of O1 services for monitoring the performance of O-RAN managed elements (e.g., near-RT RIC 124, O-CU 146, O-DU 148 of FIG. 1B). For example, O1 services manager 160 may receive requests for O1 services for monitoring the performance of the near-RT RIC from applications 123 (e.g., via R1 interface 154 of FIG. 1B), process the O1 services, and perform the O1 services for the O-RAN managed elements using an O1 interface (e.g., O1 interface 166 of FIG. 1B). In some examples, the O1 interface may implement REST/HTTPS APIs and/or NETCONF.

O1 services manager 160 is additionally, or alternatively, configured to control the deployment of O1 services for the configuration of near-RT RIC 124 and/or RAN nodes. For example, O1 services manager 160 may receive requests for O1 services for the configuration of O-RAN managed elements from applications 123 (e.g., via R1 interface 154 of FIG. 1B), process the O1 services, and may perform the O1 services for the O-RAN managed elements using an O1 interface (e.g., O1 interface 166 of FIG. 1B).

O2 services manager 162 may be configured to control the deployment of O2 services for monitoring the performance of resources of the O-RAN cloud. For example, O2 services manager 162 may receive requests for O2 services for monitoring the performance of resources within the O-RAN cloud (e.g., via R1 interface 154 of FIG. 1B), process the O2 services, and may perform the O2 services for the resources of the O-RAN cloud using an O2 interface (e.g., O2 interface 167 of FIG. 1B).

O2 services manager 162 may additionally, or alternatively, be configured to control the deployment of O2 services for the configuration of resources of the O-RAN cloud. For example, O2 services manager 162 may receive requests for O2 services for configuring resources within the O-RAN cloud from applications 123 (e.g., via R1 interface 154 of FIG. 1B), process the O2 services, and may perform the O2 services for the resources of the O-RAN cloud using an O2 interface (e.g., O2 interface 167 of FIG. 1B).

Service manager 163 is configured to manage services, such as registration of a service, update of a service registration, service discovery, etc. For example, service manager 163 may receive requests for SME services from applications 123 (e.g., via R1 interface 154 of FIG. 1B), perform the SME service (e.g., register/update a service) for one or more applications 123, and send a response to the one or more applications 123 using an R1 interface (e.g., R1 interface 154 of FIG. 1B).

Data manager 155 is configured to manage the data of applications 123. For example, data manager 155 may receive requests for DME services from applications 123

(e.g., via R1 interface 154 of FIG. 1B), perform the DME services (e.g., sending data from application configured as a data producer to application configured as a data consumer) for one or more applications 123, and send a response to the one or more applications 123 using an R1 interface (e.g., R1 interface 154 of FIG. 1B).

In accordance with the techniques of the disclosure, RAN sharing detector 103 of SMO 112 may automatically detect the presence of RAN sharing within mobile network 120 of FIGS. 1A-1C and determine a type of the RAN sharing employed within mobile network 120. In one example, RAN sharing detector 103 receives a message for implementing a network slice of RAN 109. In some examples, RAN sharing detector 103 receives the message from an NSMF of mobile core network 105 for RAN 109 of FIG. 1. The message comprises a profile including a first PLMN identifier and a first operating bands value.

RAN sharing detector 103 analyzes one or more fields in one or more data structures of the message to infer that RAN 109 is being shared and/or a RAN sharing type. For example, RAN sharing detector 103 determines that another RAN slice subnet is provisioned within RAN 109 with a second PLMN identifier. Based on the presence of the first PLMN identifier and second PLMN identifier within common RAN 109, RAN sharing detector 103 determines that RAN sharing is employed within mobile network 120. This is because the presence of RAN subnets provisioned with two different PLMN identifiers within RAN 109 indicates that two network operators, corresponding to the two PLMN identifiers, are both using resources of RAN 109.

In a first scenario, RAN sharing detector 103 determines that a second RAN slice subnet provisioned within the RAN with the second PLMN identifier has been provisioned with the same first operating bands value as specified in the profile of the message. Because the first PLMN identifier and the second PLMN identifier are configured to use the same first operating bands, RAN sharing detector 103 determines that the RAN sharing type is MOCN. This is because the presence of two different PLMN identifiers indicating use of the same operating bands indicates that two network operators, corresponding to the two PLMN identifiers, are sharing the same operating bands within RAN 109, thereby indicating that MOCN is employed by RAN 109.

In a second scenario, RAN sharing detector 103 determines that there exists no other RAN slice subnet, having a different PLMN identifier than the first PLMN identifier, that has been provisioned with the same first operating bands value within RAN 109. Therefore, because RAN slice subnets are provisioned with different PLMN identifiers (RAN 109 is shared), but such RAN slice subnets do not share the operating bands, RAN sharing detector 103 determines the RAN sharing type is MORAN. This is because the presence of two different PLMN identifiers within RAN 109 indicates that two network operators, corresponding to the two PLMN identifiers, are sharing RAN 109, but because each of the network operators have non-overlapping operating bands, there is no sharing of operating bands, thereby indicating that MORAN is employed by RAN 109.

RAN sharing detector 103 may manage network slices in the RAN based on the determined RAN sharing type. RAN sharing detector 103 may configure one or more network devices, such as RUs, DUs, and CUs of RAN 109, to forward network traffic for one or more subscriber devices 104 in accordance with the determined RAN sharing type. RAN sharing detector 103 selects configuration profiles or templates for provisioning a network slice or a slice subnet based at least in part on the determined RAN sharing type and the profile. In addition, RAN sharing detector 103 may apply one or more network policies or SLA policies for provisioning the slice subnet based at least in part on the determined RAN sharing type. Furthermore, RAN sharing detector 103 may allocate resources to the slice subnet based at least in part on the determined RAN sharing type.

In a first example, RAN sharing detector 103 configures one or more network devices, such as RUs, DUs, and CUs of RAN 109, to forward network traffic for one or more subscriber devices 104 in accordance with a determined RAN sharing type of MORAN. In this example, RAN sharing detector 103 configures RUs, DUs, and CUs of RAN 109 to forward network traffic for one or more first subscriber devices 104 that are associated with the first PLMN identifier. In particular, RAN sharing detector 103 configures RUs, DUs, and CUs of RAN 109 to forward network traffic for the one or more first subscriber devices via first operating bands corresponding to the first operating bands value specified by the profile of the received message. In addition, RAN sharing detector 103 configures RUs, DUs, and CUs of RAN 109 to forward network traffic for one or more second subscriber devices associated with a second PLMN identifier via second operating bands different from the first operating bands. In this example, the network traffic for the one or more first subscriber devices and the network traffic for the one or more second subscriber devices share a same base station and a same site.

In a second example, RAN sharing detector 103 configures one or more network devices, such as RUs, DUs, and CUs of RAN 109, to forward network traffic for one or more subscriber devices 104 in accordance with a determined RAN sharing type of MOCN. In this example, RAN sharing detector 103 configures RUs, DUs, and CUs of RAN 109 to forward network traffic for one or more first subscriber devices 104 that are associated with the first PLMN identifier and network traffic for one or more second subscriber devices associated with a second PLMN identifier via first operating bands corresponding to the first operating bands value specified by the profile of the received message. In this example, the network traffic for the one or more first subscriber devices and the network traffic for the one or more second subscriber devices share the first operating bands, a same base station, and a same site.

In a first example of the techniques of the disclosure, RAN sharing detector 103 of FIG. 4 implements a RAN network slice subnet management function (NSSMF) for mobile network 120 of FIG. 1. In this example, an NSMF triggers RAN NSSMF to create (or modify) a network slice. There may be no field in that message for RAN Sharing. However, the RAN NSSMF may apply the following logic, in accordance with the techniques of the disclosure, to automatically determine the presence of RAN sharing as well as a type of RAN sharing employed.

The RAN NSSMF receives a 3GPP TS 28.541 "SliceProfile" structure from the NSMF. The RAN NSSMF checks the "plmnInfoList" field, which is a list of "plmnInfo," and checks each "plmnInfo" structure's "pLMNId" field for a presence of a new PLMN identifier. The PLMN identifier is used to identify a mobile network operator. If there is a new PLMN identifier that was not provisioned before, this may indicate that RAN sharing is employed.

If there is a new PLMN, the RAN NSSMF checks for the presence of a 3GPP TS 28.541 "RANSliceSubnetProfile" structure. The RAN NSSMF checks for the "nrOperatingBands" structure, which indicates a carrier/frequency to be used for the slice. If there is no existing RAN slice subnet with another PLMN identifier and with the same "nrOperatingBands", this may indicate that the same frequency is not being shared by two (or more) mobile network operators, thereby indicating that MORAN is employed. If there is an existing RAN slice subnet with another PLMN and with the same "nrOperatingBands", this may indicate that the same frequency is being shared by two (or more) mobile network operators, thereby indicating that MOCN is employed.

In a second example of the techniques of the disclosure, RAN sharing detector 103 of FIG. 4 implements a core network (CN) NSSMF for mobile network 120 of FIG. 1. In this example, an NSMF triggers CN NSSMF to create (or modify) a network slice. There may be no field in that message for RAN Sharing. However, the CN NSSMF may apply the following logic, in accordance with the techniques of the disclosure, to automatically determine the presence of RAN sharing as well as a type of RAN sharing employed.

The CN NSSMF receives a 3GPP TS 28.541 "SliceProfile" structure from the NSMF. The CN NSSMF checks the "plmnInfoList" field, which is a list of "plmnInfo," and checks each "plmnInfo" structure's "pLMNId" field for a presence of a new PLMN identifier. The PLMN identifier is used to identify a mobile network operator. If there is a new PLMN identifier that was not provisioned before, this may indicate that RAN sharing is employed.

If there is a new PLMN, the CN NSSMF checks for the presence of a 3GPP TS 28.541 "CNSliceSubnetProfile" structure. The CN NSSMF checks for the "nrOperatingBands" structure, which indicates a carrier/frequency to be used for the slice. If there is no existing RAN slice subnet with another PLMN identifier and with the same "nrOperatingBands", this may indicate that the same frequency is not being shared by two (or more) mobile network operators, thereby indicating that MORAN is employed. If there is an existing RAN slice subnet with another PLMN and with the same "nrOperatingBands", this may indicate that the same frequency is being shared by two (or more) mobile network operators, thereby indicating that MOCN is employed.

In a second example of the techniques of the disclosure, RAN sharing detector 103 of FIG. 4 implements an NSMF for mobile network 120 of FIG. 1. In this example, a CSMF triggers an NSMF to create (or modify) a network slice. There may be no field in that message for RAN Sharing. However, the NSMF may apply the following logic, in accordance with the techniques of the disclosure, to automatically determine the presence of RAN sharing as well as a type of RAN sharing employed.

The NSMF receives a 3GPP TS 28.541 "ServiceProfile" structure from the CSMF. The NSMF checks the "plmnInfoList" field, which is a list of "plmnInfo," and checks each "plmnInfo" structure's "pLMNId" field for a presence of a new PLMN identifier. The PLMN identifier is used to identify a mobile network operator. If there is a new PLMN identifier that was not provisioned before, this may indicate that RAN sharing is employed.

If there is a new PLMN, the NSMF checks for the presence of a 3GPP TS 28.541 "ServiceProfile" structure. The NSMF checks for a "RadioSpectrum" structure containing the "nrOperatingBands" field, which indicates a carrier/frequency to be used for the slice. If there is no existing RAN slice subnet with another PLMN identifier and with the same "nrOperatingBands", this may indicate that the same frequency is not being shared by two (or more) mobile network operators, thereby indicating that MORAN is employed. If there is an existing RAN slice subnet with another PLMN and with the same "nrOperatingBands", this may indicate that the same frequency is being shared by two (or more) mobile network operators, thereby indicating that MOCN is employed.

Figure 5:
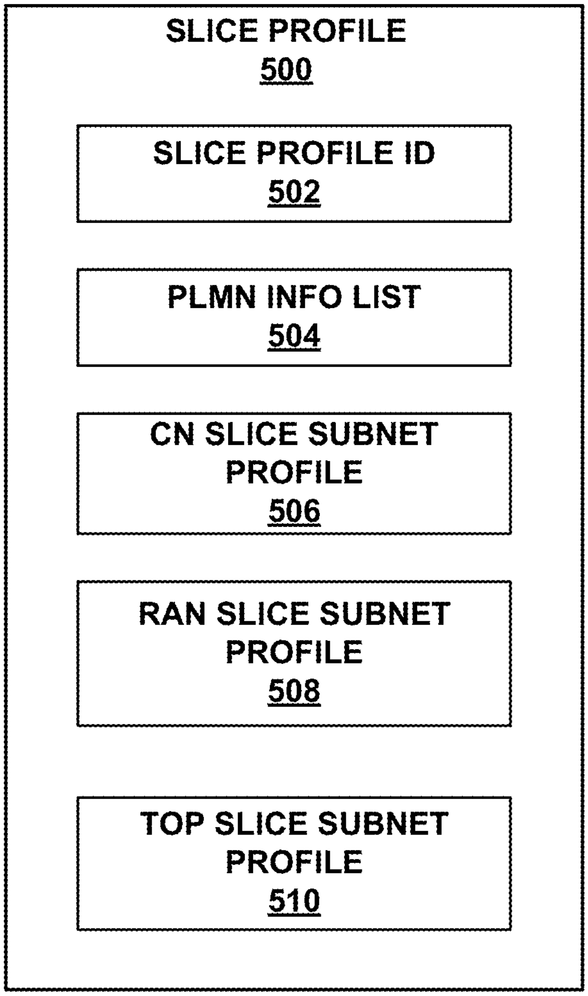
FIG. 5 is a block diagram illustrating a definition of a slice profile data structure.

FIG. 5 is a block diagram illustrating a definition of a slice profile data structure. In an aspect, slice profile 500 ("SliceProfile") may be defined as shown in Section 6.3.4 of the 5G NRM, although other formats may also be used. Slice profile 500 represents properties of a network slice subnet related requirements that should be supported by a network slice subnet instance in a 5G network. Slice profile 500 may include the fields of slice profile ID 502 ("sliceProfileID"), public land mobile network (PLMN) info list 504 ("pLMNIinfoList"), CN slice subnet profile 506 ("CNSliceSubnetProfile"), RAN slice subnet profile 508 ("RANSliceSubnetProfile"), and top slice subnet profile 510 ("TopSliceSubnetProfile"). PLMN info list 504 may include one or more PLMN identifiers (IDs) which may be used to identify an Operator.

Figure 6:
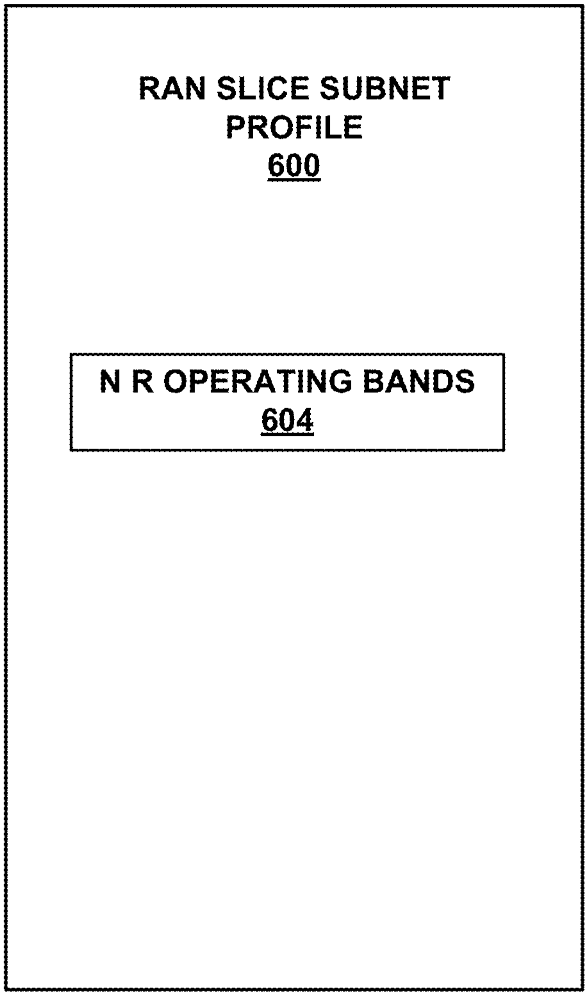
FIG. 6 is a block diagram illustrating a definition of a RAN slice subnet profile data structure.

FIG. 6 is a block diagram illustrating a definition of a RAN slice subnet profile data structure. In an aspect, RAN slice subnet profile 600 ("RANSliceSubnetProfile") may be defined as shown in Section 6.3.24 of the 5G NRM, although other formats may also be used. RAN slice subnet profile 600 represents the requirements for a RAN slice profile for network slice in a 5G network. RAN slice subnet profile 600 may include N R operating bands 602 ("nROperatingBands") (which indicates the carrier/frequency used to carry the network slice), and other fields (not shown).

Figure 7:
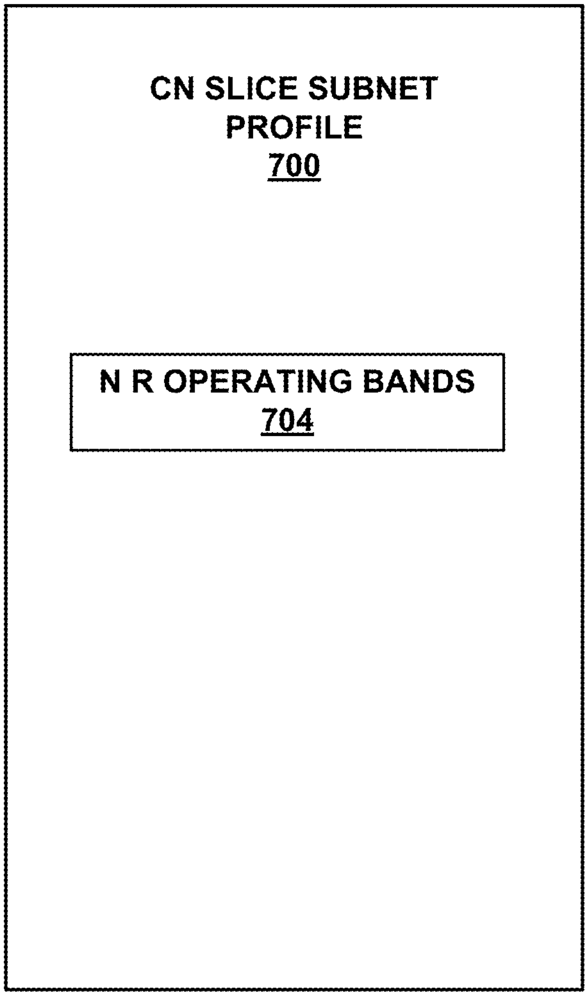
FIG. 7 is a block diagram illustrating a definition of a core network (CN) slice subnet profile data structure.

FIG. 7 is a block diagram illustrating a definition of a core network (CN) slice subnet profile data structure. In an aspect, CN slice subnet profile 700 ("CNSliceSubnetProfile") may be defined as shown in Section 6.3.23 of the 5G NRM, although other formats may also be used. CN slice subnet profile 700 represents the requirements for a CN slice profile for network slice in a 5G network. CN slice subnet profile 700 may include N R operating bands 702 ("nROperatingBands") (which indicates the carrier/frequency used to carry the network slice), and other fields (not shown).

Figure 8:
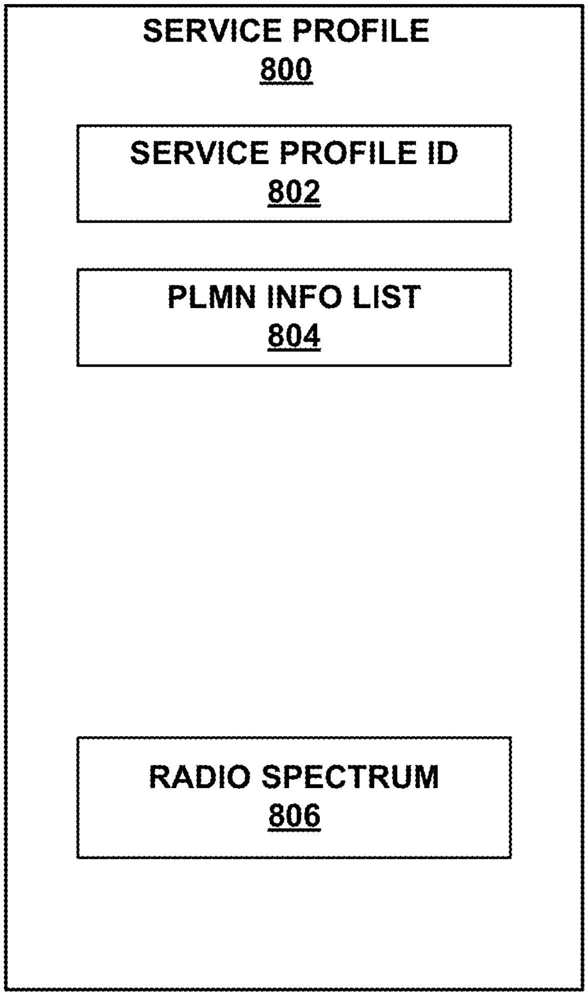
FIG. 8 is a block diagram illustrating a definition of a service profile data structure.

FIG. 8 is a block diagram illustrating a definition of a service profile data structure. In an aspect, service profile 800 ("ServiceProfile") may be defined as shown in Section 6.3.3 of the 5G NRM, although other formats may also be used. Service profile 800 represent properties of network slice related requirements that should be supported by a network slice instance in a 5G network. Service profile 800 may include service profile ID 802 ("serviceProfileID"), PLMN info list 804 ("pLMNInfoList"), and radio spectrum 806 (radioSpectrum"), and other fields (not shown). PLMN info list 804 may include one or more PLMN identifiers (IDs) which may be used to identify an Operator.

Figure 9:
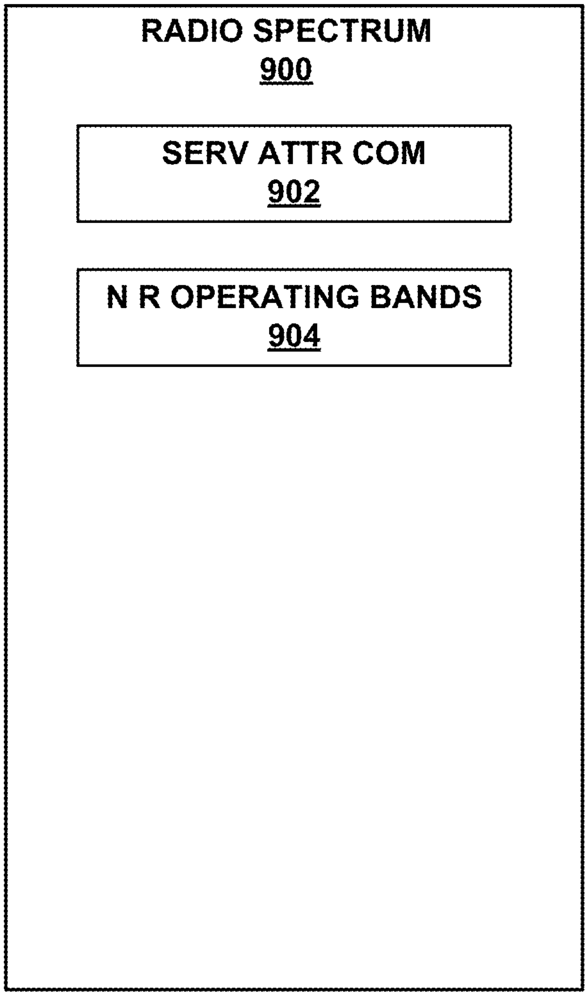
FIG. 9 is a block diagram illustrating a definition of a radio spectrum data structure.

FIG. 9 is a block diagram illustrating a definition of a radio spectrum data structure. In an aspect, radio spectrum 900 ("RadioSpectrum") may be defined as shown in Section 6.3.31 of the 5G NRM, although other formats may also be used. Radio spectrum 900 represents the radio spectrum in which the network slice should be supported in a 5G network. Radio spectrum 900 may include "SERV ATTR COM" 902 and N R operating bands 904 ("nROperatingBands") (which indicates the carrier/frequency used to carry the network slice).

With respect to FIGS. 5-9 and as described above, RAN sharing detector 103 of FIGS. 1A-IC may use the information provided in slice profile 500 to analyze the new slice subnet requirements and whether this case is MORAN or MOCN. RAN sharing detector 103 uses the PLMN info list 504 field in the slice profile 500 data structure and checks for new PLMN IDs (hence new Operators, indicating RAN sharing is enabled). RAN sharing detector 103 may use the N R operating bands 604 field of RAN slice subnet profile 600 to detect the frequencies to be used in the slice. For the NSMF case, rather than using the N R operating bands 604 field, the N R operating bands 904 field of radio spectrum 900 data structure may be used. If the frequency (or frequencies) is not in use by another PLMN, then the RAN sharing type is MORAN; if the frequency is in use, then the RAN sharing type is MOCN. This processing may be repeated for complex multi-tenant scenarios, such as Operator A and Operator B starting a MORAN based RAN sharing agreement on Operator A's infrastructure, later Operator B entering into a MOCN RAN Sharing agreement with Operator C, on top of Operator A's infrastructure.

In an aspect, RAN sharing detector 103 supports inclusion of RAN sharing SLAs in addition to slice SLAs for slice management. RAN NSSMF (or NSMF) may use the RAN Sharing SLA as part of its slice resource allocation processing whenever a new slice creation/modification is requested. This may impact procedures such as a slice feasibility check, slice creation, slice modification, and slice deletion. RAN sharing detector 103 provides support for tenant Operator NSMF(s) to drive the hosting (e.g., infrastructure leasing) of an Operator's RAN NSSMF for RAN Slice MORAN and MOCN RAN sharing scenarios. RAN sharing detector 103 provides support for multi-tenant MORAN and MOCN RAN sharing scenarios where the leasing Operator further leases resources to a third Operator. Further, a RAN NSSMF (or NSMF) may support multiple northbound consumers, whether NSMF or RAN NSSMF, for slice management operations in a RAN shared network.

RAN sharing detector 103 may process various scenarios, including for a RAN NSSMF, a CN NSSF, and a NSMF. When a RAN NSSMF is triggered by NSMF (in a message) to create (or modify) a network slice, while there is no field in that message indicating RAN sharing, RAN sharing detector 103 automatically detects RAN sharing presence and the RAN sharing type as follows. Detector 103 checks the PLMN info list 504 field of slice profile 500 (the data structure sent from NSMF to the RAN NSSMF). The PLMN info list 504 is a list of PLMN IDs. RAN sharing detector 103 checks each PLMN ID field for the presence of a new PLMN ID (which is used to identify an Operator). If there is a new PLMN ID that was not provisioned before, this indicates the presence of RAN sharing. If there is a new PLMN ID, RAN sharing detector 103 checks the N R operating bands 604 field of RAN Slice Subnet Profile 600 data structure.

If there is no existing RAN slice subnet with another PLMN ID and with the same N R operating bands value as the new PLMN ID, this means that the same frequency is not being shared by two (or more) Operators. This is the MORAN RAN sharing type.

If there is an existing RAN slice subnet with another PLMN ID and with the same N R operating bands value, this means the same frequency is being shared by two (or more) Operators. This is MOCN RAN sharing type.

For a CN NSSMF, detector 103 performs similar processing, except rather than checking RAN slice subnet profile 600, RAN sharing detector 103 checks CN slice subnet profile 700.

For a NSMF, when the NSMF is triggered by a communication service management function (CSMF) (by a message) to create (or modify) a network slice, while there is no field in that message indicating RAN sharing, RAN sharing detector 103 automatically detects RAN sharing presence and the RAN sharing type as follows. Detector 103 checks the PLMN info list 804 field of service profile 800 (the data structure sent from CSMF to NSMF). The PLMN info list 804 is a list of PLMN IDs. RAN sharing detector 103 checks each PLMN ID field for the presence of a new PLMN ID (which is used to identify an Operator). If there is a new PLMN ID that was not provisioned before, this indicates the presence of RAN sharing. If there is a new PLMN ID, detector 103 checks the N R operating bands 904 field of the radio spectrum 900 data structure.

If there is no existing RAN slice subnet with another PLMN ID and with the same N R operating bands value, this means that the same frequency is not being shared by two (or more) Operators. This is the MORAN RAN sharing type.

If there is an existing RAN slice subnet with another PLMN ID and with the same N R operating bands value, this means the same frequency is being shared by two (or more) Operators. This is MOCN RAN sharing type.

Figure 10:
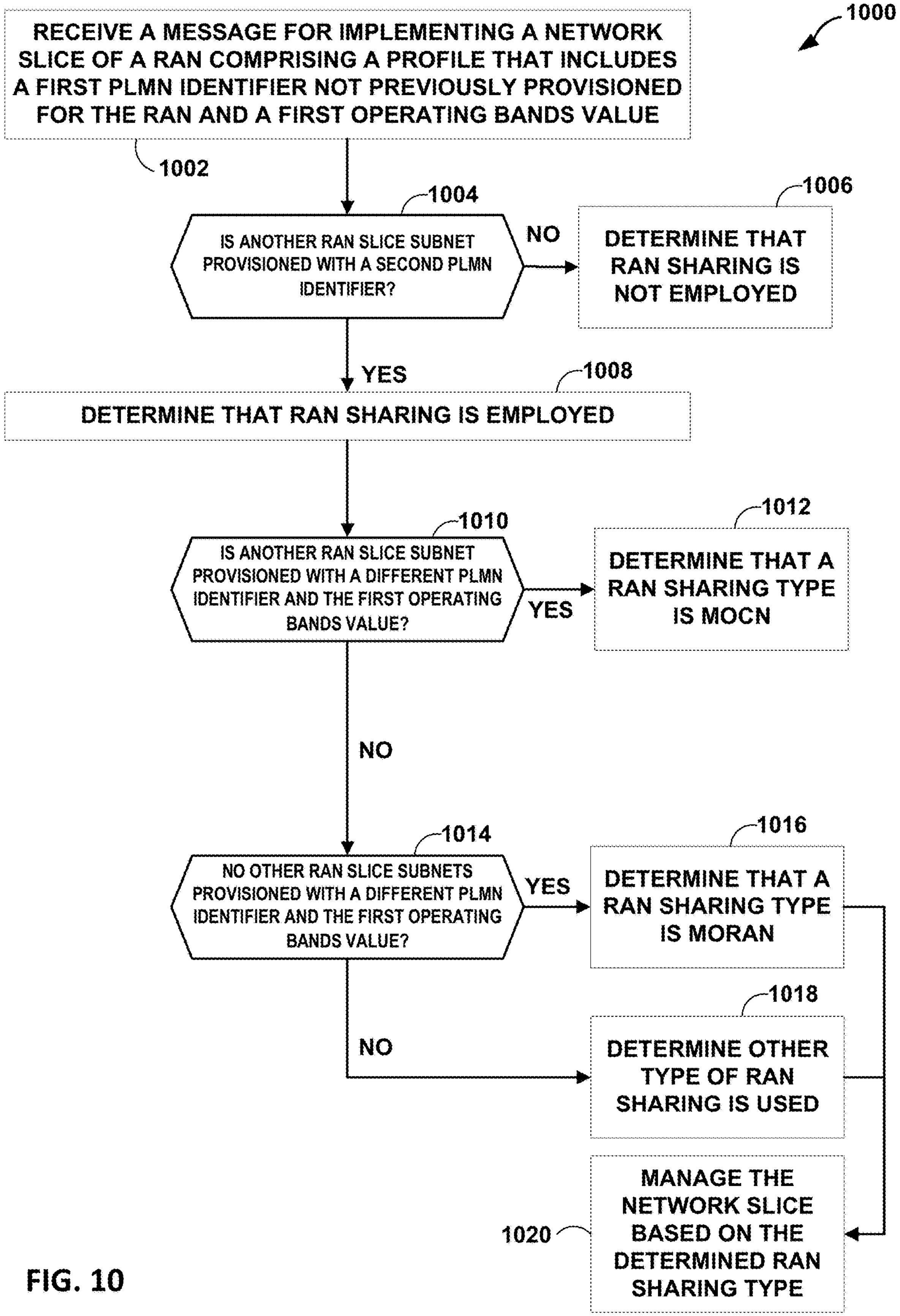
FIG. 10 is a flowchart illustrating an example operation in accordance with the techniques of the disclosure.

FIG. 10 is a flowchart illustrating example operation 1000 in accordance with the techniques of the disclosure. More specifically, FIG. 10 depicts operation 1000 for automatically detecting the presence of RAN sharing within mobile network 120 of FIGS. 1A-IC and determining a type of the RAN sharing employed within mobile network 120. FIG. 10 is described with respect to FIGS. 1A-IC for convenience. However, the techniques of the disclosure embodied by operation 1000 may be performed by other components or systems as described through the disclosure.

RAN sharing detector 103 of SMO 112 receives a message for implementing a network slice of RAN 109 (1000). In some examples, RAN sharing detector 103 receives the message from an NSMF of mobile core network 105 for RAN 109 of FIG. 1. The message comprises a profile including a first PLMN identifier and a first operating bands value.

RAN sharing detector 103 determines whether another RAN slice subnet is provisioned with a second PLMN identifier within RAN 109 (1004). For example, RAN sharing detector 103 analyzes one or more fields in one or more data structures of the message to determine whether another RAN slice subnet is provisioned with a second PLMN identifier within RAN 109. Based on the presence of only the first PLMN identifier and not a second PLMN identifier within common RAN 109, RAN sharing detector 103 determines that RAN sharing is not employed within mobile network 120 ("NO" branch of 1004:1006). This is because the absence of RAN subnets provisioned with two different PLMN identifiers within RAN 109 indicates that there is only a single network operator, corresponding to the first PLMN identifier, is using resources of RAN 109.

Based on the presence of the first PLMN identifier and the second PLMN identifier within common RAN 109, RAN sharing detector 103 determines that RAN sharing is employed within mobile network 120 ("YES" branch of 1004:1008). This is because the presence of RAN subnets provisioned with two different PLMN identifiers within RAN 109 indicates that two network operators, corresponding to the two PLMN identifiers, are both using resources of RAN 109.

RAN sharing detector 103 determines whether another RAN slice subnet is provisioned within RAN 109 with a different PLMN identifier and having the same first operating bands value as specified in the profile of the message (1010).

In response to determining that a second RAN slice subnet is provisioned within RAN 109 with a second PLMN identifier and having the same first operating bands value as specified in the profile of the message (e.g., "YES" branch of 1010), RAN sharing detector 103 determines that a RAN sharing type is MOCN (1012). This is because the presence of two different PLMN identifiers indicating use of the same operating bands indicates that two network operators, corresponding to the two PLMN identifiers, are sharing the same operating bands within RAN 109, thereby indicating that MOCN is employed by RAN 109.

In response to determining another RAN slice subnet has not been provisioned within RAN 109 with a different PLMN identifier and having the same first operating bands value as specified in the profile of the message (e.g., "NO" branch of 1010), RAN sharing detector 103 determines whether there are no other RAN slice subnets, having different PLMN identifiers than the first PLMN identifier, that have been provisioned with the same first operating bands value within RAN 109 (1014).

In response to determining that there are no other RAN slice subnets, having different PLMN identifiers than the first PLMN identifier, that have been provisioned within RAN 109 with the same first operating bands value within RAN 109 (e.g., "YES" branch of 1014), RAN sharing detector 103 determines the RAN sharing type is MORAN (1016). This is because the presence of two different PLMN identifiers within RAN 109 indicates that two network operators, corresponding to the two PLMN identifiers, are sharing RAN 109, but because each of the network operators have non-overlapping operating bands, there is no sharing of operating bands, thereby indicating that MORAN is employed by RAN 109. Otherwise (e.g., "NO" branch of 1014), RAN sharing detector 103 determines that some other type of RAN sharing is in use by RAN 109 (1018).

RAN sharing detector 103 manages the network slice in RAN 109 based on the determined RAN sharing type (1020). For example, RAN sharing detector 103 may configure one or more network devices of RAN 109 to forward network traffic for one or more subscriber devices 104 in accordance with the determined RAN sharing type. In some examples, RAN sharing detector 103 provisions at least one of a RAN slice subnet within RAN 109 or a core network slice subnet within core network 105 in accordance with the profile of the message and the determined RAN sharing type.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A computing system comprising:

processing circuitry in communication with storage media, the processing circuitry configured to:

receive a message for implementing a network slice of a Radio Access Network (RAN), the message comprising a profile that includes a first Public Land Mobile Network (PLMN) identifier for the RAN and a first operating bands value;

based at least in part on determining that at least one RAN slice subnet is provisioned within the RAN with a second PLMN identifier and the first operating bands value, determining a RAN sharing type is Multi-Operator Core Network (MOCN);

based at least in part on determining that no RAN slice subnet is provisioned within the RAN with the second PLMN identifier and the first operating bands value, determining the RAN sharing type is Multi-Operator RAN (MORAN); and manage, based on the determined RAN sharing type, the network slice in the RAN.

2. The computing system of claim 1, wherein, to manage the network slice in the RAN, the processing circuitry is configured to configure one or more network devices of the RAN to forward network traffic for one or more subscriber devices in accordance with the determined RAN sharing type.

3. The computing system of claim 2, wherein the determined RAN sharing type is MORAN, and wherein, to configure the one or more network devices to forward network traffic for the one or more subscriber devices in accordance with the determined RAN sharing type, the processing circuitry is configured to:

configure the one or more network devices to forward network traffic for one or more first subscriber devices associated with the first PLMN identifier via first operating bands corresponding to the first operating bands value; and configure the one or more network devices to forward network traffic for one or more second subscriber devices associated with the second PLMN identifier via second operating bands different from the first operating bands, wherein the network traffic for the one or more first subscriber devices and the network traffic for the one or more second subscriber devices share a base station and a site.

4. The computing system of claim 2, wherein the determined RAN sharing type is MOCN, and wherein, to configure the one or more network devices to forward network traffic for the one or more subscriber devices in accordance with the determined RAN sharing type, the processing circuitry is configured to:

configure the one or more network devices to forward network traffic for one or more first subscriber devices associated with the first PLMN identifier and network traffic for one or more second subscriber devices associated with the second PLMN identifier via first operating bands corresponding to the first operating bands value, wherein the network traffic for the one or more first subscriber devices and the network traffic for the one or more second subscriber devices share a base station and a site.

5. The computing system of claim 2, wherein, to configure the one or more network devices to forward network traffic for the one or more subscriber devices in accordance with the determined RAN sharing type, the processing circuitry is configured to:

provision at least one of a RAN slice subnet or a core network slice subnet in accordance with the profile of the message and the determined RAN sharing type.

6. The computing system of claim 1, wherein the processing circuitry is further configured to provision a RAN slice subnet within the RAN in accordance with the profile.

7. The computing system of claim 1, wherein the profile comprises a service profile received for a Network Slice Management Function (NSMF) from a Communication Service Management Function (CSMF), the service profile specifying the first PLMN identifier for the RAN and the first operating bands value.

8. The computing system of claim 1, wherein the profile comprises:

a slice profile received for a RAN Network Slice Subnet Management Function (NSSMF) from a Network Slice Management Function (NSMF), the slice profile specifying the first PLMN identifier for the RAN; and a RAN slice subnet profile that specifies the first operating bands value.

9. The computing system of claim 1, wherein the profile comprises:

a slice profile received for a core network Network Slice Subnet Management Function (NSSMF) from a Network Slice Management Function (NSMF), the slice profile specifying the first PLMN identifier for the RAN; and a core slice subnet profile that specifies the first operating bands value.

10. The computing system of claim 1, wherein the RAN is configured for RAN sharing prior to provisioning the network slice.

11. The computing system of claim 1, wherein the RAN is configured for RAN sharing after provisioning the network slice.

12. The computing system of claim 1, wherein the message is originated by a network slice management function (NSMF) for the RAN.

13. The computing system of claim 1, wherein a mobile network comprises the RAN and a core network, and wherein the message is originated by a Communication Service Management Function (CSMF) for the core network.

14. The computing system of claim 1, wherein the RAN comprises an Open Radio Access Network (O-RAN) for a mobile network.

15. The computing system of claim 1, wherein the RAN comprises a fifth-generation (5G) 3rd Generation Partnership Project (3GPP) RAN for a mobile network.

16. A method comprising:

receiving, by a computing system, a message for implementing a network slice of a Radio Access Network (RAN), the message comprising a profile that includes a first Public Land Mobile Network (PLMN) identifier for the RAN and a first operating bands value;

based at least in part on determining that at least one RAN slice subnet is provisioned within the RAN with a second PLMN identifier and the first operating bands value, determining, by the computing system, a RAN sharing type is Multi-Operator Core Network (MOCN);

based at least in part on determining that no RAN slice subnet is provisioned within the RAN with the second PLMN identifier and the first operating bands value, determining, by the computing system, the RAN sharing type is Multi-Operator RAN (MORAN); and managing, by the computing system and based on the determined RAN sharing type, the network slice in the RAN.

17. The method of claim 16, wherein managing the network slice in the RAN comprises configuring one or more network devices of the RAN to forward network traffic for one or more subscriber devices in accordance with the determined RAN sharing type.

18. The method of claim 17, wherein the determined RAN sharing type is MORAN, and wherein configuring the one or more network devices to forward network traffic for the one or more subscriber devices in accordance with the determined RAN sharing type comprises:

configuring the one or more network devices to forward network traffic for one or more first subscriber devices associated with the first PLMN identifier via first operating bands corresponding to the first operating bands value; and configuring the one or more network devices to forward network traffic for one or more second subscriber devices associated with the second PLMN identifier via second operating bands different from the first operating bands, wherein the network traffic for the one or more first subscriber devices and the network traffic for the one or more second subscriber devices share a base station and a site.

19. The method of claim 17, wherein the determined RAN sharing type is MOCN, and wherein configuring the one or more network devices to forward network traffic for the one or more subscriber devices in accordance with the determined RAN sharing type comprises:

configuring the one or more network devices to forward network traffic for one or more first subscriber devices associated with the first PLMN identifier and network traffic for one or more second subscriber devices associated with the second PLMN identifier via first operating bands corresponding to the first operating bands value, wherein the network traffic for the one or more first subscriber devices and the network traffic for the one or more second subscriber devices share a base station and a site.

20. Non-transitory, computer-readable media comprising instructions that, when executed, are configured to cause processing circuitry to:

receive a message for implementing a network slice of a Radio Access Network (RAN), the message comprising a profile that includes a first Public Land Mobile Network (PLMN) identifier for the RAN and a first operating bands value;

based at least in part on determining that at least one RAN slice subnet is provisioned within the RAN with a second PLMN identifier and the first operating bands value, determining a RAN sharing type is Multi-Operator Core Network (MOCN);

based at least in part on determining that no RAN slice subnet is provisioned within the RAN with the second PLMN identifier and the first operating bands value, determining the RAN sharing type is Multi-Operator RAN (MORAN); and manage, based on the determined RAN sharing type, the network slice in the RAN.

* * * * *